(12) United States Patent
Zhang et al.

(10) Patent No.: US 8,715,863 B2
(45) Date of Patent: May 6, 2014

(54) BATTERY HAVING ELECTROLYTE WITH MIXED SOLVENT

(75) Inventors: Zhengcheng Zhang, Newhall, CA (US); Phuong-Nghi Karen Lam, San Francisco, CA (US); Mikito Nagata, Saugus, CA (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 2105 days.

(21) Appl. No.: 11/726,632

(22) Filed: Mar. 22, 2007

(65) Prior Publication Data
US 2012/0171578 A1    Jul. 5, 2012

Related U.S. Application Data

(63) Continuation of application No. 11/346,087, filed on Feb. 2, 2006, now abandoned, and a continuation-in-part of application No. 11/056,866, filed on Feb. 10, 2005, now Pat. No. 8,076,031, and a continuation-in-part of application No. 11/056,867, filed on Feb. 10, 2005, now abandoned, and a continuation-in-part of application No. 11/056,868, filed on Feb. 10, 2005, now abandoned, and a continuation-in-part of application No. 11/056,869, filed on Feb. 10, 2005, now Pat. No. 8,076,032, which is a continuation-in-part of application No. 11/053,338, filed on Feb. 8, 2005, now Pat. No. 7,771,496, application No. 11/726,632, which is a continuation-in-part of application No. 10/971,912, filed on Oct. 21, 2004, now Pat. No. 7,718,321, and a continuation-in-part of application No. 11/211,970, filed on Aug. 24, 2005, now abandoned, and a continuation-in-part of application No. 11/271,473, (Continued)

(51) Int. Cl.
*H01M 10/056* (2010.01)
*H01M 10/052* (2010.01)
*H01M 4/13* (2010.01)
*H01M 4/134* (2010.01)
*H01M 6/16* (2006.01)

(52) U.S. Cl.
USPC ........... 429/326; 429/329; 429/330; 429/331; 429/337; 429/338; 429/341; 429/342; 429/231.95; 29/623.1

(58) Field of Classification Search
USPC ......... 429/331, 326, 341, 324, 330, 338, 342, 429/329, 337, 340, 307, 313, 218.1; 29/623.1
See application file for complete search history.

(56) References Cited

U.S. PATENT DOCUMENTS 3,172,899 A    3/1965 Bailey
(Continued)

FOREIGN PATENT DOCUMENTS

EP    0 450 981 A1    10/1991
(Continued)

OTHER PUBLICATIONS

Machine Translation of: JP 2004/171981 A, Hibara et al., Jun. 2004.*
(Continued)

*Primary Examiner* — Kenneth Douyette
(74) *Attorney, Agent, or Firm* — Gavrilovich, Dodd & Lindsey, LLP

(57) ABSTRACT

The battery includes an electrolyte activating one or more cathodes and one or more anodes. The electrolyte includes one or more salts in a solvent. The solvent includes one or more organic solvents and one or more silanes and/or one or more siloxanes.

38 Claims, 3 Drawing Sheets

Related U.S. Application Data filed on Nov. 10, 2005, and a continuation-in-part of application No. 11/272,261, filed on Nov. 10, 2005, now Pat. No. 7,476,468, and a continuation-in-part of application No. 11/072,739, filed on Mar. 3, 2005, now Pat. No. 7,598,003, which is a continuation-in-part of application No. 10/962,125, filed on Oct. 7, 2004, now abandoned, which is a continuation-in-part of application No. 10/496,231, filed on May 20, 2004, now abandoned.

(60) Provisional application No. 60/668,878, filed on Apr. 5, 2005.

(56) References Cited

U.S. PATENT DOCUMENTS

| | | | |
|---|---|---|---|
| 3,530,159 A | 9/1970 | Guinet et al. | |
| 3,734,876 A | 5/1973 | Chu | |
| 4,259,467 A | 3/1981 | Keogh et al. | |
| 4,830,939 A | 5/1989 | Lee et al. | |
| 4,849,856 A | 7/1989 | Funari et al. | |
| 4,908,283 A | 3/1990 | Takahashi et al. | |
| 5,037,712 A | 8/1991 | Shackle et al. | |
| 5,112,512 A | 5/1992 | Nakamura | |
| 5,272,021 A | 12/1993 | Asai et al. | |
| 5,300,375 A | 4/1994 | Chaloner-Gill | |
| 5,362,493 A | 11/1994 | Skotheim et al. | |
| 5,419,984 A | 5/1995 | Chaloner-Gill et al. | |
| 5,475,127 A | 12/1995 | Klein et al. | |
| 5,538,812 A | 7/1996 | Lee et al. | |
| 5,593,787 A | 1/1997 | Dauth et al. | |
| 5,593,795 A * | 1/1997 | Chen et al. | 429/313 |
| 5,609,974 A | 3/1997 | Sun | |
| 5,633,098 A | 5/1997 | Narang et al. | |
| 5,690,702 A | 11/1997 | Skotheim et al. | |
| 5,700,300 A | 12/1997 | Jensen et al. | |
| 5,731,104 A | 3/1998 | Ventura et al. | |
| 5,753,389 A | 5/1998 | Gan et al. | |
| 5,772,934 A | 6/1998 | MacFadden | |
| 5,830,600 A * | 11/1998 | Narang et al. | 429/326 |
| 5,882,812 A | 3/1999 | Visco et al. | |
| 5,885,733 A | 3/1999 | Ohsawa et al. | |
| 5,919,587 A | 7/1999 | Mukherjee et al. | |
| 5,961,672 A | 10/1999 | Skotheim et al. | |
| 6,013,393 A | 1/2000 | Taniuchi et al. | |
| 6,015,638 A | 1/2000 | Ventura et al. | |
| 6,124,062 A | 9/2000 | Horie et al. | |
| 6,168,885 B1 | 1/2001 | Narang et al. | |
| 6,181,545 B1 | 1/2001 | Amatucci et al. | |
| 6,210,835 B1 | 4/2001 | Arai | |
| 6,245,465 B1 | 6/2001 | Angell et al. | |
| 6,248,481 B1 | 6/2001 | Visco et al. | |
| 6,252,762 B1 | 6/2001 | Amatucci | |
| 6,268,088 B1 | 7/2001 | Oh et al. | |
| 6,337,383 B1 | 1/2002 | West et al. | |
| 6,436,583 B1 * | 8/2002 | Mikhaylik | 429/340 |
| 6,447,952 B1 | 9/2002 | Spiegel et al. | |
| 6,482,912 B2 | 11/2002 | Boudjouk et al. | |
| 6,495,287 B1 | 12/2002 | Kolb et al. | |
| 6,573,009 B1 | 6/2003 | Noda et al. | |
| 6,610,109 B2 | 8/2003 | Noh | |
| 6,653,015 B2 | 11/2003 | Yoshida et al. | |
| 2002/0028388 A1 | 3/2002 | Lee | |
| 2002/0051911 A1 | 5/2002 | Okada | |
| 2002/0081496 A1* | 6/2002 | Tsujioka et al. | 429/307 |
| 2002/0192554 A1 | 12/2002 | Woo et al. | |
| 2003/0036003 A1 | 2/2003 | Shchori et al. | |
| 2003/0099884 A1 | 5/2003 | Chiang et al. | |
| 2003/0104282 A1 | 6/2003 | Xing et al. | |
| 2003/0180624 A1 | 9/2003 | Oh et al. | |
| 2003/0180625 A1 | 9/2003 | Oh et al. | |
| 2003/0198869 A1 | 10/2003 | West et al. | |
| 2004/0146786 A1* | 7/2004 | Sato et al. | 429/326 |
| 2004/0197668 A1 | 10/2004 | Jung et al. | |

FOREIGN PATENT DOCUMENTS

| | | | |
|---|---|---|---|
| EP | 0 525 728 A1 | 2/1993 | |
| EP | 0 581 296 A2 | 2/1994 | |
| EP | 0 581 296 A3 | 2/1994 | |
| EP | 0 922 049 B1 | 2/1998 | |
| EP | 0 932 215 A1 | 1/1999 | |
| EP | 0 796 511 B1 | 8/1999 | |
| EP | 1 024 502 A1 | 8/2000 | |
| EP | 0 932 215 B1 | 5/2001 | |
| EP | 1 202 374 A1 | 5/2002 | |
| JP | 57-034661 | 2/1982 | |
| JP | 57-034662 | 2/1982 | |
| JP | 57-080670 | 5/1982 | |
| JP | 57-111957 | 7/1982 | |
| JP | 57-176669 A2 | 10/1982 | |
| JP | 59-224072 A2 | 12/1984 | |
| JP | 60-195877 | 10/1985 | |
| JP | 60-216461 | 10/1985 | |
| JP | 61-288374 | 12/1986 | |
| JP | 62-209169 A2 | 9/1987 | |
| JP | 63-010466 | 1/1988 | |
| JP | 63-310569 | 12/1988 | |
| JP | 02-080462 | 3/1990 | |
| JP | 02-262274 | 10/1990 | |
| JP | 02-291603 | 12/1990 | |
| JP | 03-139566 | 6/1991 | |
| JP | 60-052893 A2 | 7/1992 | |
| JP | 05-036441 | 2/1993 | |
| JP | 05-290616 | 11/1993 | |
| JP | 07-320782 | 12/1995 | |
| JP | 08-078053 A2 | 3/1996 | |
| JP | 09-306544 | 11/1997 | |
| JP | 11-214032 A2 | 1/1998 | |
| JP | 10-172615 A2 | 6/1998 | |
| JP | 11-185804 | 7/1999 | |
| JP | 11-238523 | 8/1999 | |
| JP | 11-302383 | 11/1999 | |
| JP | 11-302384 A2 | 11/1999 | |
| JP | 11-306856 A2 | 11/1999 | |
| JP | 11-306857 A2 | 11/1999 | |
| JP | 2000-058123 | 2/2000 | |
| JP | 2000-154254 A2 | 6/2000 | |
| JP | 2000-222939 A2 | 8/2000 | |
| JP | 2000-277152 A2 | 10/2000 | |
| JP | 2001-068115 | 3/2001 | |
| JP | 2001-110455 A2 | 4/2001 | |
| JP | 2001-185165 A2 | 7/2001 | |
| JP | 2001-283907 A2 | 10/2001 | |
| JP | 2001-283913 | 10/2001 | |
| JP | 2002-063936 A2 | 2/2002 | |
| JP | 2002-151150 A2 | 5/2002 | |
| JP | 2002 155142 A2 | 5/2002 | |
| JP | 2002-298913 A2 | 10/2002 | |
| JP | 2002-343440 A2 | 11/2002 | |
| JP | 2003-002974 A2 | 1/2003 | |
| JP | 2004171981 A * | 6/2004 | H01M 10/40 |
| JP | 2004-235141 | 8/2004 | |
| WO | WO 96/21953 | 7/1996 | |
| WO | WO 98/07729 A1 | 2/1998 | |
| WO | WO 00/00495 A1 | 1/2000 | |
| WO | WO 00/08654 | 2/2000 | |
| WO | WO 00/25323 A1 | 5/2000 | |
| WO | WO 01/73884 A1 | 10/2001 | |
| WO | WO 01/96446 A1 | 12/2001 | |
| WO | WO 01/99209 A2 | 12/2001 | |
| WO | WO 03/083970 A1 | 10/2003 | |
| WO | WO 03/083971 A1 | 10/2003 | |
| WO | WO 03/083972 A1 | 10/2003 | |
| WO | WO 03/083973 A1 | 10/2003 | |
| WO | WO 03/083974 A1 | 10/2003 | |
| WO | WO 03/090299 A1 | 10/2003 | |

OTHER PUBLICATIONS

M. Armand, New Electrode Material, Proceedings of the NATO Sponsored Advanced Study Institute on Fast Ion Transport in Solids, Solid State Batteries and Devices, 1972, Belgirate, Italy.

(56) References Cited

OTHER PUBLICATIONS

D. Fenton et al., Complexes of Alkali Metal Ions with Poly(Ethylene Oxide), Polymer, Nov. 1973, 589, 14.
S. Kohama et al., Alcoholysis of Poly(methylhydrogensiloxane), Journal of Applied Polymer Science, 1977, 21, 863-867.
E. Tsuchida et al., Conduction of Lithium Ions in Polyvinylidene Fluoride and its Derivates-I, Electrochimica Acta, 1983, 591-595, 28(5).
L. Hardy et al., Chloride Ion Conductivity in a Plasticized Quaternary Ammonium Polymer, Macromolecules, 1984, 975-977, 17.
P. Blonsky et al., Polyphosphazene Solid Electrolytes, Journal of American Chemical Society, 1984, 6854-6855, 106.
D. Bannister et al., A Water-Soluble Siloxane: Poly(ethylene glycol) Comb Polymer, Journal of Polymer Science: Polymer Letters Edition, 1985, 465-467, 23.
I. Kelly et al., Poly(Ethylene Oxide) Electrolytes for Operation at Near Room Temperature, Journal of Power Sources, 1985, 13-21, 14.
D. Fish et al., Conductivity of Solid Complexes of Lithium Perchlorate with Poly{[w-methoxyhexa(oxyethylene)ethoxy]methylsiloxane}$^{a)}$, Makromol. Chem., Rapid Commun., 1986, 115-120, 7.
P. Hall et al. Ion Conductivity in Polysiloxane Comb Polymers With Ethylene Glycol Teeth, Polymer Communications, 1986, 3 pages, 27.
D.R. MacFarlane et al., Synthesis and Aqueous Solution Phase Behavior of Siloxane-Poly (Alkylene Glycol) Comb Copolymers, Department of Chemistry, Monash University, Clayton, Victoria, Australia, *Polymer Preprints*, 1987, 28, 405-406.
D. Fish et al., Polymer Electrolyte Complexes of $ClO_4$ and Comb Polymers of Siloxane with Oligo-oxyethylene Side Chains, British Polymer Journal, 1988, 281-288, 20, 3.
S. Ganapathiappan et al., A New Class of Cation Conductors: Polyphosphazene Sulfonates, Macromolecules, 1988, 2299-2301, 21.
I. Khan et al., Comblike Polysiloxanes with Oligo(oxyethylene) Side Chains, Synthesis and Properties, Macromolecules, 1988, 2684-2689, 21.
R. Spindler et al., Investigations of a Siloxane-Based Polymer Electrolyte Employing $^{13}C$, $^{29}Si$, $^{7}Li$, and $^{23}Na$ Solid State NMR Spectroscopy, Journal of American Chemical Society, 1988, 3036-3043, 110.
R. Spindler et al., Synthesis NMR Characterization, and Electrical Properties of Siloxane-Based Polymer Electrolytes, Macromolecules, 1988, 648-654, 21.
S. Ganapathiappan et al., Synthesis, Characterization and Electrical Response of Phosphazene Polyelectrolytes, Journal of America Chemical Society, 1989, 4091-4095, 111.
M. Ouchi et al., Convenient and Efficient Tosylation of Oligoethylene Glycois and the Related Alcohols in Tetrahydrofuran-Water in the Presence of Sodium Hydroxide, The Chemical Society of Japan, 1990, 1260,1262, 63, 4.
L. Dominey et al., Thermally Stable Lithium Salts for Polymer Electrolytes, Electrochimica Acta, 1992, 1551-1554, 37(9).
F. Alloin et al., Triblock Copolymers and Networks Incorporating Oligo (Oxyethylene) Chains, Solid State Ionics, 1993, 3-9, 60.
C. St. Pierre et al., Lithium-Metal-Polymer Battery for Electric Vehicle and Hybrid Electric Vehicle Applications, www.avestor.com/en/automotive.html, infoavestor.com 1993, 11 pages.
G. Zhou et al., Solvent-Free Cation-Conduction Polysiloxane Electrolytes with Pendant Oligo(oxyethylene) and Sulfonate Groups, Macromolecules, 1993, 2202-2208, 26.
M. Gauthier et al., Large Lithium Polymer Battery Development the Immobile Solvent Concept, Journal of Power Sources, 1995, 163-169, 54.
H. Allcock et al., Polyphosphazenes Bearing Branched and Linear Oligoethyleneoxy Side Groups as Solid Solvents for Ionic Conduction, Macromolecules, 1996, 7544-7552, 29.
K. Abraham et al., Highly Conductive PEO-Like Polymer Electrolytes, Journal of Chemical Materials, 1997, 1978-1988, 9(9).
M. Furlani et al., Time Resolved Luminescence and Vibrational Spectroscopic Studies on Complexes of Poly(Ethylene Oxide) Oligomers and Eu(TFSI)$_3$ Salt, 11$^{th}$ International Conference on Solid State Ionics, 1997, 10 pages.
J. Gnanaraj et al., Studies on Comb-like Polymer Blend with Poly(Ethylene Oxide)—Lithium Perchlorate Salt Complex Electrolyte, Polymer, 1997, 3709-3712, 38(14).
F. Gray, Polymer Electrolytes, RSC Materials Monographs, UK, 1997, 46-49.
C. Letourneau et al., Progress in Lithium-Metal-Polymer Battery System for Electric Vehicles, http://www.avestor.com/iactivefiles/evs15.pdf, info@avestor.com INTELEC, Oct. 1998, Canada, 1-10.
J. Blackwell et al., B($C_6F_5$)$_3$-Catalyzed Silation of Alcohols: A Mild, General Method for Synthesis for Silyl Ethers, Journal of Organic Chemistry, 1999, 4887-4892, 64.
R. Hooper et al., A Highly Conductive Solid-State Polymer Electrolyte Based on a Double-Comb Polysiloxane Polymer with Oligo(Ethylene Oxide) Side Chains, Organometallics, American Chemical Society, 1999, 3249-3251, 18(17).
Z. Wang et al., Thermal, Electrochemical, and Spectroscopic Characterizations of Hyperbranched Polymer Electrolyte, Journal of Electrochemical Society, 1999, 2209-2215, 146(6).
M. Anderman et al., Advanced Batteries for Electric Vehicles: An Assessment of Performance, Cost, and Availability, Prepared for State of California Air Resources Board by the Year 2000 Battery Technology Advisory Panel, 2000, i-ix and 60-65.
A. Reiche et al., Gel Electrolytes on the Basis of Oligo(Ethylene Glycol)$_m$ Dimethacrylates—Thermal, Mechanical and Electrochemical Properties in Relationship to the Network Structure, Polymer, 2000, 3821-3836, 41.
R. Hooper et al., Highly Conductive Siloxane Polymers, Macromolecules, 2001, 931-936, 34.
X. Hou et al., Novel Interpenetrating Polymer Network Electrolytes, Polymer, 2001, 4181-4188, 42.
C.F. Rome, The Unique Properties of Silicone at the Service of the Petroleum Industry, Hydrocarbon Asia, 2001, 42-49, 'www.hcasia.safan.com/mag/may-jun01/Tech-Silicone.pdf'.
W. Xu et al., LiBOB and Its Derivatives Weakly Coordinating Anions, and the Exceptional Conductivity of Their Nonaqueous Solutions, Electrochemical and Solid-State Letters, 2001, E1-E4, 4(1).
W. Xu et al., Ionic Conductivity and Electrochemical Properties of Lithium Orthoborate Salts, http://www.electrochem.org/meetings/past/200/abstracts/symposia/bla/0107.pdf, United States, Sep. 5, 2001.
N. Katayama et al., Thermal Stability of Propylene Carbonate and Ethylene Carbonate-Propylene Carbonate-Based Electrolytes for Use in Li Cells, Journal of Power Sources, 2002, 1-6, 4769, http://www.sciencedirect.com/web-editions.
K. Xu et al., LiBOB as Salt for Lithium-Ion Batteries, Electrochemical and Solid State Letters, 2002, pp. A26-A29, vol. 5(1).
J. Alper, The Battery: Not Yet a Terminal Case, Science, May 2002, 1224-1226, vol. 296, www.sciencemag.org.
Y. Kang et al., Solid Polymer Electrolytes based on Cross-linked Siloxane-g-oligoethylene oxide: Ionic conductivity and Electrochemical Properties, Abstract book of 11th International Meeting on Lithium Batteries (IMLB 11), Jun. 23-28, 2002.
B. Oh et al., New Interpenetrating Electrolyte Network-Type Siloxane Polymer Electrolyte, Electrochemical and Solid State Letters, 2002, E59-E61, 5(11), The Electrochemical Society, Inc., Sep. 11, 2002.
T. Fujii et al., Application of LiBOB as an Electrolyte Salt for 4 V Class Lithium Ion Rechargeable Cells, whttp://www2.electrochem.org/cgi-bin/abs?mtg=202&abs=0203, Oct. 24, 2002, United States.
W. Xu et al., Structures of Orthoborate Anions and Physical Properties of Their Lithium Salt Nonaqueous Solutions, Journal of the Electrochemical Society, 2003, 1-0, 150(1).
International Search Report, dated May 1, 2003, received in relation to Application No. PCT/US03/02127.
Y. Kang et al., Solid Polymer Electrolytes Based on Cross-Linked Polysiloxane-g-oligo(ethylene oxide): Ionic Conductivity and Electrochemical Properties, *Journal of Power Sources* 119-121 (Jun. 1, 2003), pp. 448-453.
International Search Report, dated Jul. 11, 2003, received in relation to Application No. PCT/US03/02128.

(56) References Cited

OTHER PUBLICATIONS

International Search Report, dated Jul. 11, 2003, received in relation to Application No. PCT/US03/08740.
International Search Report, dated Sep. 12, 2003, received in relation to Application No. PCT/US03/08784.
International Search Report, dated Oct. 9, 2003, received in relation to Application No. PCT/US03/08779.
International Search Report, dated Oct. 9, 2003, received in relation to Application No. PCT/US03/08783.
Z. Zhang et al., Cross-Linked Network Polymer Electrolytes Based on a Polysiloxane Backbone with Oligo(oxyethylene) Side Chains: Synthesis and Conductivity, Macromolecules, Oct. 28, 2003, vol. 36, No. 24, 9176-9180.
NICODOM Ltd., Inorganic Library of FT-IR Spectra Inorganics II—Boron Compounds, homepage, website http://www.ftir.cz/INLIB2.html and http://www.ftir.cz/home_page_of_nicodom_sro.htm.
R. Zhang et al., Modification of Polymethylhydrosiloxane by Dehydrocoupling Reactions Catalyzed by Transition Metal Complexes: Evidence for the Preservation of Linear Siloxane Structures, Silicon Chemistry, 2003, vol. 2, 271-277.
Z. Zhang et al., Network-Type Ionic Conductors Based on Oligoethyleneoxy-Functionalized Pentamethylcyclopentasiloxanes, Macromolecules, 2005, vol. 38, 5714-5720.
Z. Zhang et al., Synthesis and Ionic Conductivity of Cyclosiloxanes with Ethyleneoxy-Containing Substituents, Chem. Mater., 2005, vol. 17, 5646-5650.
M. Ue, Recent Technological Trend in Electrolyte Materials for Li-ion Batteries, Abstract 31, International Meeting on Lithium Batteries (IMLB 12), 2004, The Electrochemical Society, Inc.

* cited by examiner

BATTERY HAVING ELECTROLYTE WITH MIXED SOLVENT

REFERENCE TO RELATED APPLICATIONS

This application is a Continuation of U.S. patent application Ser. No. 11/346,087, filed on Feb. 2, 2006, now abandoned, entitled "Battery Having Electrolyte with Mixed Solvent"; and this application is a continuation-in-part of U.S. patent application Ser. No. 11/056,866, filed on Feb. 10, 2005, now U.S. Pat. No. 8,076,031, entitled "Electrochemical Device Having Electrolyte Including Disiloxane;" and this application is a continuation-in-part of U.S. patent application Ser. No. 11/056,867, filed on Feb. 10, 2005, now abandoned, entitled "Electrochemical Device Having Electrolyte Including Trisiloxane;" and this application is a continuation-in-part of U.S. patent application Ser. No. 11/056,868, filed on Feb. 10, 2005, now abandoned, entitled "Electrochemical Device Having Electrolyte Including Tetrasiloxane;" and this application is a continuation-in-part of U.S. patent application Ser. No. 11/056,869, filed on Feb. 10, 2005, now U.S. Pat. No. 8,076,032, entitled "Electrolyte Including Silane for use in Electrochemical Devices;" which is a continuation-in-part of U.S. patent application Ser. No. 11/053,338, filed on Feb. 8, 2005, now U.S. Pat. No. 7,771,496, entitled "Reduction of Impurities in Battery Electrolyte;" and this application is also a continuation-in-part of U.S. patent application Ser. No. 10/971,912, filed on Oct. 21, 2004, now U.S. Pat. No. 7,718,321, entitled "Battery Having Electrolyte Including Organoborate Salt;" and this application is a continuation-in-part of U.S. patent application Ser. No. 11/211,970, filed on Aug. 24, 2005 now abandoned, entitled "Battery Having Electrolyte Including Substituted Borane Additive;" and this application is a continuation-in-part of U.S. patent application Ser. No. 11/271,473, filed on Nov. 10, 2005, now pending, entitled "Flame Retardant Battery;" and this application is a continuation-in-part of U.S. patent application Ser. No. 11/272,261, filed on Nov. 10, 2005, now U.S. Pat. No. 7,476,468, entitled "Flame Retardant Battery;" and this application is a continuation-in-part of U.S. patent application Ser. No. 11/072,739, filed on Mar. 3, 2005, now U.S. Pat. No. 7,598,003, entitled "Battery Having Enhanced Energy Density;" which is a continuation-in-part of U.S. patent application Ser. No. 10/962,125, filed on Oct. 7, 2004, now abandoned, and entitled "Battery Having Electrolyte Including One or More Additives;" which is a continuation-in-part of U.S. patent application Ser. No. 10/496,231, filed on May 20, 2004, now abandoned, entitled "Method for Fabricating Composite Electrodes;" which claims priority to PCT Application number PCT/US03/08783, filed on Mar. 20, 2003, now WO 03083974A1, entitled "Method for Fabricating Composite Electrodes;" and this application claims the benefit of U.S. Provisional Patent Application Ser. No. 60/668,878, filed on Apr. 5, 2005, now abandoned, entitled "Flame Retardant Battery;" each of which is incorporated herein in its entirety.

STATEMENT REGARDING FEDERALLY SPONSORED RESEARCH OR DEVELOPMENT

This invention was made with government support under W15P7T-05-C-R403 awarded by U.S. Army Communications-Electronic Research & Engineering Center. The government may have certain rights in the invention.

FIELD

The present invention relates to electrochemical devices, and more particularly to electrolytes for use in electrochemical devices.

BACKGROUND

Recent improvements in portable electronic devices have increased the demand for batteries with a high energy density in order to increase the longevity of these devices. A variety of lithium secondary batteries have been studied to meet these demands. Many of these batteries have explored the use of lithium metal anodes and carbonaceous anodes. Theoretical calculations show that lithium metal may be able to provide a higher energy density than a carbonaceous anode.

Batteries having lithium metal anodes are difficult to commercialize because they generate dendritic lithium on the surface of the lithium metal during charge and discharge cycle. The dendritic lithium can grow toward the cathode through the separator and cause an internal short in the battery. This short can result in a dangerous release of heat. Additionally, current can concentrate on the dendrites causing a localized deposition of lithium on the anode. This localized deposition can reduce the cycling efficiency of the battery.

Further, lithium metal anodes can reduce the cycling performance of a battery. Conventional organic electrolytes in contact with lithium metal get reduced and can form a passivation layer on the anode. When other anode materials are employed, the formation of the passivation layer stops or slows when the surface of the active material is covered by a stable passivation layer. However, the growth of the dendritic lithium permits the passivation layer to continue forming and increases the surface area over which the passivation layer must be formed. The continued formation of the passivation layer reduces the battery's coulombic efficiency and can accelerate electrolyte degradation. There is a need for a secondary battery that can take advantage of lithium metal anodes.

SUMMARY

The battery includes an electrolyte activating one or more anodes and one or more cathodes. The electrolyte includes one or more salts in a solvent. The solvent includes one or more organic solvents and one or more components selected from a group consisting of silanes and siloxanes. At least one of the anodes includes or consists of one or more components selected from the group consisting of lithium metal, lithium metal alloy and lithium metal intermetallic compound.

A method of generating an electrochemical device is also disclosed. The method includes activating one or more anodes and one or more cathodes with an electrolyte. The electrolyte includes one or more salts in a solvent. The solvent includes one or more organic solvents and one or more components selected from a group consisting of silanes and siloxanes. At least one of the anodes includes or consists of one or more components selected from the group consisting of lithium metal, lithium metal alloy and lithium metal intermetallic compound.

The siloxanes can include one or more silicons linked to a substituent that includes a poly(alkylene oxide) moiety or a cyclic carbonate moiety. The siloxane can be a polysiloxane, tetrasiloxane, a trisiloxane or a disiloxanes. The silanes can include a silicon linked to one or more substituents that each include a poly(alkylene oxide) moiety or a cyclic carbonate moiety. In some instances, at least one of the one or more organic solvents can selected from a group consisting of cyclic carbonates, linear carbonates, dialkyl carbonates, aliphatic carboxylate esters, linear ethers, cyclic ethers, and fluorinated carboxylate esters.

The one or more salts can be an organoborate salt such as an aromatic bis[chelato]borate or a nonaromatic bis[chelato]borate. In some instance, the organoborate is selected from a group consisting of bis[benzenediolato (2-)-O,O']borate, bis [substituted benzenediolato (2-)-O,O']borate, bis[salicylato] borate, bis[substituted salicylato]borate, bis[2,2'-biphenyl-diolato(O,O')]borate, bis[substituted 2,2'-biphenyldiolato(O,O')]borate), bis[oxalato(2-)-O,O']borate, bis[malonato(2-)-O,O']borate, bis[succinato]borate, [.alpha.-hydroxy-carboxylato]borate, [.alpha.-hydroxy-carboxylato]borate, [.beta.-hydroxy-carboxylato]borate, [.beta.-hydroxy-carboxylato]borate, [.alpha.-dicarboxylato]borate, and [.alpha.-dicarboxylato]borate. In some instances, the organoborate salt is a lithium organoborate salt. In one example, the organoborate salt includes lithium bis-oxalato borate (LiBOB) or lithium difluoro oxalatoborate (LiDfOB).

The organoborate salt can be represented by the following formula:

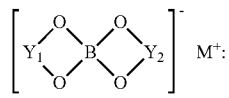

wherein $M^+$ is a metal ion selected from the Group I or Group II elements in the periodic table; $Y_1$ and $Y_2$ are each selected from the group consisting of: —$CX(CR_2)_a CX$—, —$CZZ'(CR_2)_a CZZ'$—, —$CX(CR_2)_a CZZ'$—, —$SO_2(CR_2)_b SO_2$—, and —$CO(CR_2)_b SO_2$—; X is =O or =NR', Z is alkyl, halogenated alkyl, —C=NR', $CR'_3$ or R'; Z' is alkyl, halogenated alkyl, —C=NR', $CR'_3$ or R'; R' is halogen or hydrogen; R is hydrogen, alkyl, halogenated alkyl, cyano, or halogen; a is 0 to 4 and b is 1 to 4.

The organoborate salt can be represented by the following formula:

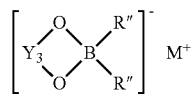

wherein $M^+$ is a metal ion selected from the Group I or Group II elements; $Y_3$ is selected from the group consisting of —$CX(CR_2)_a CX$—, —$CZZ'(CR_2)_a CZZ'$—, —$CX(CR_2)_a CZZ'$—, —$SO_2(CR_2)_b SO_2$—, and —$CO(CR_2)_b SO_2$—; X is =O or =NR', Z is alkyl, halogenated alkyl, —C=NR', $CR'_3$ or R'; Z' is alkyl, halogenated alkyl, —C=NR', $CR'_3$ or R'; R" is a halogen; R' is halogen or hydrogen; R is hydrogen, alkyl, halogenated alkyl, cyano, or halogen; a is 0 to 4 and b is 1 to 4.

In addition to organoborate salts or as an alternative to organoborate salts, the one or more non-organoborate salts selected from a group consisting of $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, LiSCN, $LiO_2$, $LiO_3SCF_3$, $LiO_2CCF_3$, $LiSO_6F$, $LiB(C_6H_5)_4$, Li-methide, Li-imide and lithium alkyl fluorophosphates.

The battery can include one or more cathodes that each include, fluorinated carbon ($CF_x$), lithium vanadium oxide such as the lithium vanadium oxide represented by $Li_{1+y}$ $V_3O_8$, polypyrrole, $H_2V_3O_8$, metal vanadium oxides represented by $M_zH_{1-z}V_3O_8$, $CuCl_2$, silver vanadium oxides such as $Ag_2V_4O_{11}$, $LiCuCl_2$, $TiS_2$, $MoO_2$, $MoS_2$, $MnO_2$, $V_2O_5$, $V_6O_{13}$, $H_2V_3O_8$, $LiCoO_2$, $LiNiO_2$, $LiFePO_4$, $LiMnO_2$, $LiCoNiMnO_2$, $LiCoNiM'O_2$, and combinations thereof. In some instances, the cathode active materials include or consist of one or more active materials.

DESCRIPTION

Figure 1:
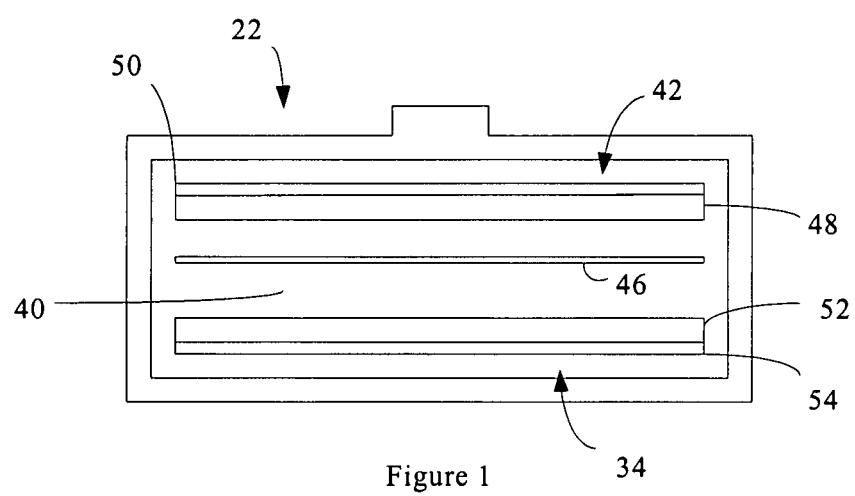
FIG. 1 is a schematic view of a battery.

A battery employing an anode that includes lithium metal is disclosed. The battery employs an electrolyte that includes one or more salts in a solvent. The solvent includes one or more organic solvents and one or more silicon based solvents selected from a group consisting of silanes and siloxanes. When this solvent is employed in a secondary battery, the solvent has been provided surprising cycling performance. For instance, the battery disclosed in Example 1 has a discharge capacity retention of about 100% even after 108 cycles. The passivation layer that results from this solvent has been studied and shown to be compact and homogenous. Additionally, this passivation layer appears to prevent additional consumption of the lithium metal. The passivation layers formed from conventional electrolytes that include only organic solvents are often porous and weak after cycling. The features are characteristic of a high surface area cause by heavy dendrite formation on the surface of lithium metals. In contrast, the passivation layer formed from the current electrolyte appears to be appears to be denser, stronger, and show fewer dendrites after cycling illustrating a more stable passivation layer. Without being bound to theory, it is believed that these features of the passivation layer are the source of the improved cycling performance that results from the disclosed electrolytes.

The solvent can include polysiloxanes but preferably includes or consists of tetrasiloxanes, trisiloxanes and/or disiloxanes. Tetrasiloxanes, trisiloxanes or disiloxanes can yield an electrolyte with a lower viscosity than electrolytes that include similarly structured polysiloxanes. The reduced viscosity can increase the conductivity of the electrolyte and can improve wetting of electrodes in an electrochemical device enough to enhance the homogeneity of the electrolyte distribution in the cell. The enhanced homogeneity can be sufficient to increase the capacity and cycling properties of batteries. Accordingly, the cycling performance of the battery can be enhanced by the siloxanes in the solvent and by the passivation layer stability.

The solvent can also include or consist of one or more silanes. Silanes can have a viscosity that is reduced even relative to similarly structured polysiloxanes, tetrasiloxanes, trisiloxanes or disiloxanes. The additional reduction in viscosity can further increase the conductivity of the electrolyte and improve wetting of electrodes in an electrochemical device enough to further increase the capacity and cycling properties of batteries. Accordingly, the cycling performance of the battery can be enhanced by both the silanes in the solvent and by the passivation layer stability.

The tetrasiloxanes, trisiloxanes, disiloxanes and/or silanes can also provide an electrolyte with high ionic conductivities in addition to enhanced cycling properties. For instance, one or more of the silicons in the tetrasiloxanes, trisiloxanes, disiloxanes and/or silanes can each be linked to a first substituent that includes a poly(alkylene oxide) moiety. The poly(alkylene oxide) moieties can help dissolve lithium salts employed in the electrolyte. Accordingly, the tetrasiloxanes, trisiloxanes, disiloxanes and/or silanes can provide an electrolyte with a concentration of free ions suitable for use in batteries. Additionally, the poly(alkylene oxide) moieties can enhance the ionic conductivity of the electrolyte at room temperatures. For instance, these siloxanes and/or silanes can yield an electrolyte with an ionic conductivity higher than $1 \times 10^{-4}$ S/cm at 25° C. or higher than $3 \times 10^{-4}$ S/cm at 37° C. At these performance levels, the electrolytes can be suitable for use in batteries such as high-energy and long cycle life lithium secondary batteries, satellite applications, and biomedical devices such as defibrillators.

The presence of the organic solvents in the electrolyte can further reduce the viscosity of the siloxanes and/or the silanes. Additionally or alternately, the addition of organic salts can increase the ionic conductivity of the electrolyte. Examples of suitable organic solvents include, but are not limited to, cyclic carbonates, linear carbonates, dialkyl carbonates, aliphatic carboxylate esters, gamma.-lactones, linear ethers, cyclic ethers, aprotic organic solvents, and fluorinated carboxylate esters. In some instances, the solvent excludes organic solvents. In some instances, the solvent excludes siloxanes and silanes. A suitable volume ratio of the total organic solvents to the total siloxane and silane is greater than 1:4, or 3:7 and/or less than 2:1. The volume ratio is preferably less than 1:4 or 1:1.

FIG. 1 is a schematic view of a suitable battery 22. The battery 22 includes an electrolyte 40 activating a cathode 42 and an anode 44. A separator 46 separates the cathode 42 and anode 44. The cathode 42 includes a cathode medium 48 on a cathode substrate 50. The anode 44 includes an anode medium 52 on an anode substrate 54. Although the battery is illustrated as including one anode and one cathode, the battery can include more than one anode and/or more than one cathode with the anodes and cathodes each separated by a separator. Additionally, the battery can have a variety of different configurations such as stacked configuration, a "jelly-roll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

Suitable cathode substrates 50 include, but are not limited to, aluminum, stainless steel, titanium, or nickel substrates. An example of a cathode substrate that can enhance conductivity is a carbon coated aluminum current collector. The carbon coating may be applied using any suitable process known in the art, such as by coating a paste made of carbon and a binder. The thickness of the carbon coating can be less than 15 microns, less than 10 microns, about 3 microns or less, and less than 2 microns.

The cathode medium 48 includes or consists of one or more cathode active materials. Suitable cathode active materials include, but are not limited to, $Li_xVO_y$, $LiCoO_2$, $LiNiO_2$, $LiM_{1-x}Co_yMe_zO_2$ $LiMn_{0.5}Ni_{0.5}O_2$, $LiMn_{(1/3)}Co_{(1/3)}Ni_{(1/3)}O_2$, $LiFePO_4$, $LiMn_2O_4$, $LiFeO_2$, $LiMc_{0.5}Mn_{1.5}O_4$, $LiMn_{1.5}McO_4$, vanadium oxide, lithium vanadium oxides, carbon fluoride (CFO and mixtures thereof wherein Me is Al, Mg, Ti, B, Ga, Si, Mn, Zn, Mo, Nb, V and Ag and combinations thereof, and wherein Mc is a divalent metal such as Ni, Co, Fe, Cr, Cu, and combinations thereof. In some instances, x is $\geq \frac{1}{3}$ before initial discharge of the battery and/or y is in a range of $\frac{7}{3}$ to 3 before initial discharge of the battery and/or x' is $\geq 0$ before initial discharge of the battery and/or $1-x'+y'+z'=1$ and/or x" is $\geq 0$ or x" is $>0.2$ before initial discharge of the battery. Example cathode materials include one or more lithium transition metal oxides selected from the group consisting of $Li_xVO_y$, such as $LiV_3O_8$, and $LiV_6O_{18}$, $LiCoO_2$, $LiNiO_2$, $LiNi_{1-x}Co_yMe_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, and $LiMnO_2$.

The cathode medium 48 can optionally include binders and/or conductors such as PVDF, graphite and acetylene black in addition to the one or more cathode active materials. Suitable binders include, but are not limited to, PVdF, fluoropolymer, polytetrafluoroethylene or polyvinylidene fluoride present at about 1 to about 5 weight percent of the cathode active material, and styrene butadiene rubber (SBR). Suitable conductors and/or diluents include, but are not limited to, acetylene black, carbon black and/or graphite or metallic powders such as powdered nickel, aluminum, titanium and stainless steel.

A suitable material for the anode substrate 54 includes, but is not limited to, titanium, a titanium alloy, stainless steel, nickel, copper, tungsten, tantalum and alloys thereof.

The anode medium 52 includes or consists of one or more components selected from the groups consisting of lithium metal, lithium metal alloys, and lithium intermetallic compounds. The anode active material can include one or more layers of a material that includes lithium and one or more layers of other anode materials. Suitable lithium metal alloys can be a substitutional alloy or an interstitial alloy. Examples of suitable alloys include, but are not limited to, Li—Si, Li—B, Li—Si—B, Li—Al. Another example of a suitable lithium alloy is a lithium-aluminum alloy. However, increasing the amounts of aluminum present in the alloy can reduce the energy density of the cell. Examples of suitable intermetallic compounds include, but are not limited to, intermetallic compounds that include lithium metal and one or more components selected from the group consisting of Ti, Cu, Sb, Mn, Al, Ge, Si, Pb, Sn, In, Bi, Ag, Ba, Ca, Hg, Pd, Pt, Te, Zn and La. In some instances, the anode active material consists of lithium metal. Further, the anode active medium can serve as both the anode active medium and as the anode substrate. For instance, the anode can consist of lithium metal. The reaction potential for lithium metals to give up electrons is generally less than 1V versus $Li/Li^+$ equilibrium potential. In instances where the anode includes a substrate, suitable methods for placing the anode active material on the anode substrate include, but are not limited to, lamination, deposition, sputtering, or dipping.

In some instances, the anode consists of the anode medium. Accordingly, the anode medium also serves as the anode substrate. For instance, the anode can consist of lithium metal.

Suitable separators 46 include, but are not limited to, polyolefins such as polyethylene. Illustrative separator materials also include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene/polyethylene membrane commercially available under the designation CELGARD (Celanese Plastic Company, Inc.), a membrane commercially available under the designation DEXIGLAS (C. H. Dexter, Div., Dexter Corp.), and a polyethylene membrane commercially available from Tonen Chemical Corp.

The electrolyte includes one or more salts in a solvent. The one or more salts can include or consist of an organoborate salts. Suitable organoborate salts include lithium organoborate salt. The organoborate salt can be a bis[bidentate]borate, also known as a bis[chelato]borate. Suitable bis[bidentate] borates include aromatic bis[bidentate]borates such as bis [benzenediolato (2-)-O,O']borate, bis[substituted benzenediolato (2-)-O,O']borate, bis[salicylato]borate, bis [substituted salicylato]borate, bis[2,2'-biphenyldiolato(O, O')]borate, and bis[substituted 2,2'-biphenyldiolato(O,O')] borate]. In some instances, the organoborate salt is a nonaromatic bis[bidentate]borate, such as bis[oxalato (2-)-O, O']borate, bis[malonato (2-)-O,O']borate, bis[succinato]borate, [.alpha.-hydroxy-carboxylato]borate, [.alpha.-hydroxy-carboxylato]borate, [.beta.-hydroxy-carboxylato]borate, [.beta.-hydroxy-carboxylato]borate, [.alpha.-dicarboxylato] borate, and [.alpha.-dicarboxylato]borate. Examples of lithium bis(bidentate) salts include lithium bis(tetrafluoroethylenediolato)borate LiB(OCF$_2$CF$_2$O)$_2$, lithium bis (hexafluoropropylenediolato)borate LiB[OCF(CF$_3$)CF$_2$O]$_2$ and lithium bis[1,2-tetrakis(trifluoromethyl)ethylenedialato (2-)O,O-']borate or lithium bis(perfluoropinacolato)borate LiB[OC(CF$_3$)$_2$C(CF$_3$)$_2$O]$_2$. A preferred lithium bis(bidentate) salt is lithium bis-oxalato borate (LiBOB).

One example of the organoborate salt includes: a boron linked directly to at least two oxygens and an organic moiety linking two of the oxygens. In some instances, the boron is also linked directly to two halogens. Another example of the organoborate salt includes: a boron linked directly to each of four oxygens; a first organic moiety linking two of the oxygens; and a second organic moiety linking the other two oxygens. The first organic moiety and the second organic moiety can be the same or different. The first organic moiety and/or the second organic moiety can be: substituted or unsubstituted; and/or branched or unbranched; and/or saturated or unsaturated. The backbone of an organic moieties extending between the boron linked oxygens can include only carbons or can include carbons and one or more oxygens. In some instances, one or both of the organic moieties are halogenated. In one example, the first organic moiety and/or the second organic moiety is fluorinated.

An example of the organoborate salt is represented by the following Formula I-A:

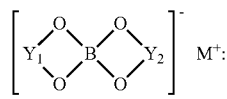

wherein M$^+$ is a metal ion selected from the Group I or Group II elements; Y$_1$ and Y$_2$ are each selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4. M$^+$ is preferably selected from Group I and is most preferably lithium. Y$_1$ and Y$_2$ can be the same or different. Z and Z' can be the same or different. The R' can be the same or different and the R can be the same or different.

In an example of an organoborate salt according to Formula I-A, Y$_1$ and Y$_2$ are each —CX(CR$_2$)$_a$CX—; each X is =O and each R is hydrogen. In another example of the organoborate salt, Y$_1$ and Y$_2$ are each —CX(CR$_2$)$_a$CX—; each X is =O and each R is a halogen. In another example of the organoborate salt, Y$_1$ and Y$_2$ are each —CX(CR$_2$)$_a$CX—; each X is =O and each R is fluoro.

In a preferred example of an organoborate salt according to Formula I-A, Y$_1$ and Y$_2$ are each —CZZ'(CR$_2$)$_a$CZZ'—; each of the R' is hydrogen and each of the R are hydrogen. In another preferred example, Y$_1$ and Y$_2$ are each —CZZ'(CR$_2$)$_a$CZZ'—; each of the R' is halogen and each of the R are halogens. In another preferred example, Y$_1$ and Y$_2$ are each —CZZ'(CR$_2$)$_a$CZZ'—; each of the R' is fluorine and each of the R are fluorine.

Other suitable organoborate salts for use with the battery include mono[bidentate]borates. For instance, the salt can be a dihalo mono[bidentate]borate such as a dihalo oxalato borate. An example of a dihalo oxalato borate is a difluoro oxalato borate. The organoborate salts can be lithium organoborate salts such as lithium mono[bidentate]borate. For instance, the salt can be a lithium dihalo mono[bidentate] borate such as a lithium dihalo oxalato borate. A preferred lithium dihalo oxalato borate is a lithium difluoro oxalato borate (LiDfOB).

The organoborate salt can include a boron linked directly to two halogens and also linked directly to two oxygens that are linked to one another by an organic moiety. The organic moiety and/or the second organic moiety can be: substituted or unsubstituted; and/or branched or unbranched; and/or saturated or unsaturated. The backbone of the organic moiety can include only carbons or can include carbons and one or more oxygens. In some instances, the organic moiety is completely or partially halogenated. In one example, the organic moiety is fluorinated.

An example of the organoborate salt is represented by the following Formula I-B:

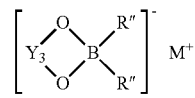

wherein M$^+$ is a metal ion selected from the Group I or Group II elements; Y$_3$ is selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R" is a halogen; R' is halogen or hydrogen; R is hydrogen; alkyl, halogenated alkyl, cyano, or halogen; a is 0 to 4 and b is 1 to 4. M$^+$ is preferably selected from Group I and is most preferably lithium. Z and Z' can be the same or different. The R" can be the same or different. The R' can be the same or different. The R can be the same or different.

In an example of an organoborate salt according to Formula I-B, Y$_3$ is —CX(CR$_2$)$_a$CX—; each X is =O and each R" is a halogen. In another example of the organoborate salt, Y$_3$ is —CX(CR$_2$)$_a$CX— and each R" is a fluorine.

In some instances, the organoborate salt is a tridentate borate such as a lithium tridentate borate. Alternately, the organoborate salt can be a tetradentate borate such as lithium tetradentate borate. An example lithium tetradentate borate includes LiB[OC(CF$_3$)$_2$]$_4$.

Examples of organoborate salts are disclosed in U.S. Provisional Patent Application Ser. No. 60/565,211, filed on Apr. 22, 2004, entitled "Organoborate Salt in Electrochemical Device Electrolytes," and incorporated herein in its entirety; and in U.S. Provisional Patent Application Ser. No. 60/563, 850, filed on Apr. 19, 2004, entitled "Organoborate Salt in Electrochemical Device Electrolytes," and incorporated herein in its entirety; and in U.S. Provisional Patent Application Ser. No. 60/563,848, filed on Apr. 19, 2004, entitled "Composition Check for Organoborate Salt Employed in Electrochemical Device Electrolytes," and incorporated herein in its entirety.

The electrolyte can include one or more salts in addition to the one or more organoborate salts or as an alternative to the one or more organoborate salts. Suitable salts for use with the electrolyte include, but are not limited to, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC_4F_9CO_2$, $LiC(CF_3SO_2)_3$, $LiN(SO_2C_2F_5)_2$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, $LiB_{10}Cl_{10}$, lithium lower aliphatic carboxylate, chloroboran lithium, lithium tetraphenylborate, LiBr, LiI, LiSCN, LiCl, imides, Li-methide, Li-imide, lithium alkyl fluorophosphates and mixtures thereof. In some instances, the electrolyte includes one or more of these salts and excludes organoborate salts.

In some instances, the electrolyte is prepared such that the total concentration of the one or more salts in the electrolytes is about 0.1 to 2.0 M, about 0.5 to 1.5 M, or about 0.7 to 1.2 M. In some instances, the one or more organoborate salts are preferably present in the electrolyte at a concentration of about 0.1 to 2.0 M, about 0.5 to 1.5 M, or about 0.7 to 1.2 M. In some instances, the one or more organoborate salts are present in a concentration less than 1.5 M, or less than 0.1M, or less than 0.05 M and other salts are present in the electrolyte.

The solvent can include or consist of one or more polysiloxanes having a backbone with five or more silicons. One or more of the silicons can be linked to a first substituent and/or to a second substituent. The first substituent includes a poly(alkylene oxide) moiety and the second substituent includes a cyclic carbonate moiety. Suitable first substituents include side chains or cross links to other polysiloxanes. Further, each of the first substituents can be the same or different. In one example of the polysiloxane, each of the first substituents is a side chain. Suitable second substituents include side chains. Further, each of the second substituents can be the same or different. Each of the second substituents can be the same or different. In some instances, the terminal silicons in the backbone are not linked to either a first substituent or a second substituent. Each of the non-terminal silicons can be linked to at least one first substituent or to at least one second substituent. In some instances, the polysiloxane excludes second substituents. One or more of the silicons in the backbone of the polysiloxane can be linked to a cross-link to another polysiloxane. The cross-link can include a poly(alkylene oxide) moiety. Examples of suitable polysiloxanes are disclosed in U.S. patent application Ser. No. 10/810,019, filed on Mar. 25, 2004, entitled "Polysiloxane for Use in Electrochemical Cells," and incorporated herein in its entirety.

Examples of suitable polysiloxanes have a structure according to General Formula II:

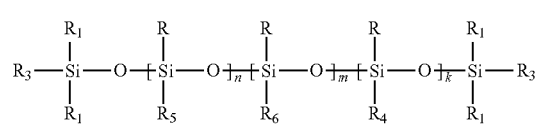

where R is alkyl or aryl; $R_1$ is alkyl or aryl; $R_3$ is represented by:

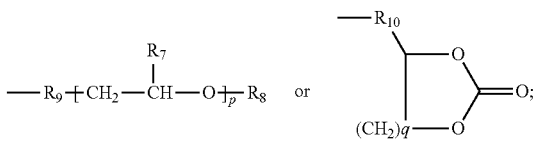

$R_4$ is a cross link that links the polysiloxane backbone to another polysiloxane backbone; $R_5$ is represented by:

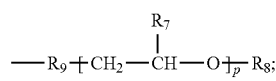

$R_6$ is represented by:

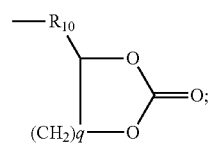

$R_7$ is hydrogen; alkyl or aryl; $R_8$ is alkyl or aryl; $R_9$ is oxygen or an organic spacer; $R_{10}$ is an oxygen or an organic spacer; k is 0 or greater than 0; p is 3, greater than 3 and/or less than 20; q is 1 to 2; m is 0 or greater than 0 and n is 0 or greater than 0 and can be 2 to 25. In some instances, n+m+k is 3 or greater than 3. In some instances, m is greater than 0 and a ratio of n:m is 1:1 to 100:1 and is more preferably 5:1 to 100:1. One or more of the alkyl and/or aryl groups can be substituted, unsubstituted, halogenated, and/or fluorinated. A suitable organic spacer can include one or more —$CH_2$— groups. Other suitable spacers can include an alkylene, alkylene oxide, or bivalent ether moiety. These spacers can be substituted or unsubstituted. The above spacers can be completely or partially halogenated. For instance, the above spacers can be completely or partially fluorinated. In one example, $R_9$ is represented by: —O—$(CH_2)_3$—O— or —$(CH_2)_3$—O— with the oxygen linked to the polyethylene oxide moiety. In another example, $R_{10}$ is represented by: —$CH_2$—O—$(CH_2)_3$— where the single —$CH_2$— group is positioned between the carbonate and the oxygen or —$CH_2$—O—.

In instances, where a polysiloxane according to Formula II includes one or more cross links, a suitable ratio for (number of cross links):(m+n) includes, but is not limited to, a ratio in a range of 1:4 to 1:200, in a range of 1:6 to 1:100, or in a range of 1:6 to 1:70.

Each of the $R_3$ can be the same or different. In some instances, one of the $R_3$ includes a poly(alkylene oxide) moiety and another $R_3$ includes a cyclic carbonate moiety. The structures of $R_3$ can be the same as the structure of $R_5$. In some instances, the $R_3$ structures are different from the $R_5$ structures. When m is greater than 0, the structures of $R_3$ can be the same as the structure of $R_6$. In some instances, the $R_3$ structures are different from the structure of $R_6$. In some instances, m is 0 and $R_3$ and $R_5$ each have a structure according to:

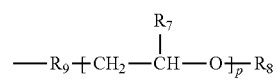

and the structures for $R_3$ are different from the structure for $R_5$ or the same as the structure for $R_5$.

When a polysiloxane according to General Formula I is to be employed in an electrolyte, a suitable average molecular weight for the polysiloxane includes, but is not limited to, an average molecular weight less than or equal to 3000 g/mole.

The solvent can include or consist of one or more tetrasiloxanes. Tetrasiloxanes can have a reduced viscosity relative to similarly structured tetrasiloxanes. A suitable tetrasiloxane has a backbone with two central silicons and two terminal silicons. One or more of the silicons can be linked to a first substituent and/or to a second substituent. The first substituent includes a poly(alkylene oxide) moiety and the second substituent includes a cyclic carbonate moiety. Suitable first substituents include side chains or cross links to other tetrasiloxanes. Further, each of the first substituents can be the same or different. In one example of the tetrasiloxane, each of the first substituents is a side chain. Suitable second substituents include side chains. Further, each of the second substituents can be the same or different. Each of the second substituents can be the same or different. In some instances, the terminal silicons in the backbone are not linked to either a first substituent or a second substituent. Each of the central silicons can be linked to at least one first substituent or to at least one second substituent. In some instances, the tetrasiloxane excludes second substituents. One or more of the silicons in the backbone of the tetrasiloxane can be linked to a cross-link to another tetrasiloxane. The cross-link can include a poly(alkylene oxide) moiety. Examples of suitable tetrasiloxanes are disclosed in U.S. patent application Ser. No. 11/056,868, filed on Feb. 10, 2005, entitled "Electrochemical Device Having Electrolyte Including Tetrasiloxane," and U.S. patent application Ser. No. 10/971,926, filed on Oct. 21, 2004, entitled "Electrochemical Device Having Electrolyte Including Tetrasiloxane," and U.S. Provisional Patent Application Ser. No. 60/543,951, filed on Feb. 11, 2004, entitled "Siloxane," each of which is incorporated herein in its entirety.

An example of a suitable tetrasiloxane includes a backbone with a first silicon linked to a first side chain that includes a poly(alkylene oxide) moiety. Additionally, a second silicon in the backbone is linked to a second side chain that includes a poly(alkylene oxide) moiety or a cyclic carbonate moiety. In some instances, the first silicon and the second silicon are each terminal silicons. In other instances, the first silicon and the second silicon are each central silicons.

As the number of substituents that include a poly(alkylene oxide) moiety and/or a cyclic carbonate moiety increases, the viscosity of an electrolyte can increase undesirably and/or the ionic conductivity of an electrolyte can decrease undesirably. As a result, in some instances, the tetrasiloxane includes no more than two poly(alkylene oxide) moieties or no more than one poly(alkylene oxide) moiety. Additionally or alternately, the tetrasiloxane can include no more than two carbonate moieties or no more than one carbonate moiety. For instance, a third one of the silicons and a fourth one of the silicons can each be linked to entities that each exclude a poly(alkylene oxide) moiety and/or that each exclude a cyclic carbonate moiety. For instance, the third silicon and the fourth silicon can each be linked to substituents such as side chains that each exclude a poly(alkylene oxide) moiety and/or that each exclude a cyclic carbonate moiety. In some instances, the entities linked to the backbone of the tetrasiloxane other than the first side chain and the second side chain each exclude a poly(alkylene oxide) moiety and/or a cyclic carbonate moiety. For instance, the entities linked to the backbone of the tetrasiloxane other than the first side chain and the second side chain can each be a substituent such as a side chain and each of these substituents can exclude a poly(alkylene oxide) moiety and/or a cyclic carbonate moiety.

A silicon on the tetrasiloxane backbone can be linked directly to a poly(alkylene oxide) moiety or a spacer can be positioned between the poly(alkylene oxide) moiety and the silicon. The spacer can be an organic spacer. When the first silicon and the second silicon are each central silicons linked directly to a side chain that includes a poly(alkylene oxide) moiety, the poly(alkylene oxide) moieties each include an oxygen linked directly to the backbone. The poly(alkylene oxide) moiety can be an oligo(alkylene oxide) moiety. In some instances, the poly(alkylene oxide) moiety is a poly(ethylene oxide) moiety.

When a silicon is linked to side chains that includes a cyclic carbonate moiety, the side chain can include a spacer that links the carbonate moiety to the silicon or an oxygen can link the cyclic carbonate moiety to the silicon. The spacer can be an organic spacer.

In instances where the first silicon and the second silicons are each terminal silicons, the first and second silicons can each be linked to a side chain that includes a poly(alkylene oxide) moiety. Formula III provides an example of a tetrasiloxane where the first silicon and the second silicon are each terminal silicons linked to a side chain that includes a polyethylene oxide moiety. Formula III:

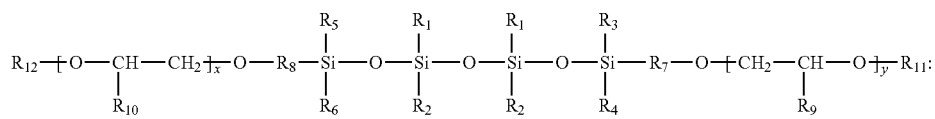

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is nil or a spacer; $R_8$ is nil or a spacer; $R_9$ is a hydrogen, an alkyl group or an aryl group; $R_{10}$ is a hydrogen, an alkyl group or an aryl group; $R_{11}$ is an alkyl group or an aryl group; and $R_{12}$ is an alkyl group or an aryl group; x is 1 or greater and/or 12 or less and y is 1 or greater and/or 12 or less. One or more of the alkyl and/or aryl groups can be substituted, unsubstituted, halogenated, and/or fluorinated. The spacers can be organic spacers and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_7$ and $R_8$ are each nil or are each a spacer. In one example, $R_7$ and/or $R_8$ is represented by: —$(CH_2)_3$—. In one example: $R_1$; $R_2$; $R_3$; $R_4$; $R_5$; $R_6$; $R_{11}$; and $R_{12}$ are each methyl groups.

Examples of preferred tetrasiloxanes according to Formula III are represented by Formula III-A through Formula III-B. Formula III-A illustrates an example of a tetrasiloxane having terminal silicons linked to side chains that include an organic spacer linking a poly(alkylene oxide) moiety to a terminal silicon. Formula III-B illustrates an example of a tetrasiloxane having terminal silicons that are each linked to an oxygen included in a poly(alkylene oxide) moiety.

Formula III-A:

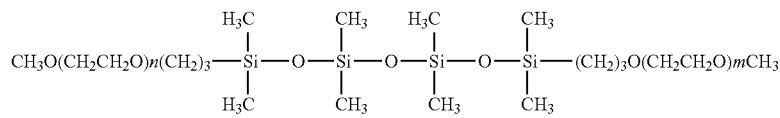

wherein n is 1 to 12 and m is 1 to 12.

Formula III-B:

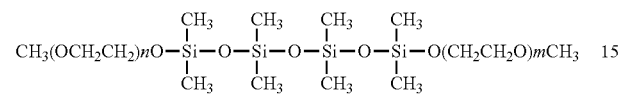

wherein n is 1 to 12 and m is 1 to 12.

Another suitable tetrasiloxane has a backbone with one of two central silicons linked to a side chain that includes a poly(alkylene oxide) moiety and the other central silicon linked to a side chain that includes a poly(alkylene oxide) moiety or a carbonate moiety. When each of the central silicons is linked to a side chain that includes a poly(alkylene oxide) moiety, the poly(alkylene oxide) moieties each include an oxygen linked directly to a silicon in the backbone.

Another example of a suitable tetrasiloxane is represented by Formula IV.

Formula IV:

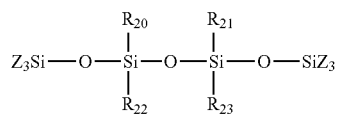

wherein: $R_{20}$ is an alkyl group or an aryl group; $R_{21}$ is an alkyl group or an aryl group; $R_{22}$ is represented by Formula IV-A; $R_{23}$ is represented by Formula IV-B or IV-C and each Z is an alkyl or an aryl group. The Zs can be the same or can be different.

Formula IV-A:

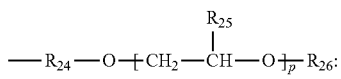

wherein $R_{24}$ is an organic spacer or nil; $R_{25}$ is hydrogen, alkyl or aryl; $R_{26}$ is alkyl or aryl and p is 1 or more and/or 12 or less. The organic spacer and can include one or more —CH$_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{24}$ is represented by: —(CH$_2$)$_3$—.

Formula IV-B:

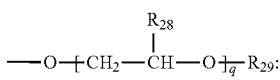

wherein $R_{28}$ is hydrogen, alkyl or aryl; $R_{29}$ is alkyl or aryl; q is 1 or more and/or 12 or less.

Formula IV-C:

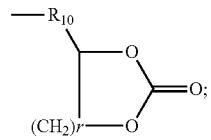

wherein $R_{30}$ is an organic spacer and r is 1 or 2. Suitable organic spacers for Formula IV through N—C can include one or more —CH$_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{30}$ is a bivalent ether moiety represented by: —CH$_2$—O—(CH$_2$)$_3$— with the —(CH$_2$)$_3$— linked to a silicon on the backbone of the tetrasiloxane. In another example, $R_{30}$ is an alkylene oxide moiety represented by: —CH$_2$—O— with the oxygen linked to a silicon on the backbone of the tetrasiloxane.

One or more of the alkyl and aryl groups specified in Formula IV through Formula IV-C can be substituted, unsubstituted, halogenated, and/or fluorinated. When $R_{23}$ is according to Formula IV-B, $R_{24}$ can be nil or can be a spacer. In one example, $R_{23}$ is according to Formula IV-C and $R_{30}$ is represented by: —CH$_2$—O—(CH$_2$)$_3$— where the single —CH$_2$— group is positioned between the carbonate and the oxygen. In an example, the Zs, $R_{20}$, $R_{21}$, $R_{26}$, and $R_{29}$ are each a methyl group. In another example, $R_{22}$ is represented by Formula IV-A and $R_{23}$ is represented by Formula IV-B and in another example $R_{23}$ is represented by Formula IV-A and $R_{23}$ is represented by Formula IV-C.

Examples of tetrasiloxanes according to Formula IV are represented by Formula IV-D through Formula IV-F. Formula IV-D represents a tetrasiloxane where each of the central silicons is linked to a side chain that includes a poly(ethylene oxide) moiety. The central silicons are each linked directly to an oxygen included in a poly(ethylene oxide) moiety. Formula IV-E and Formula IV-F each represent an example of a tetrasiloxane wherein a central silicon is linked to a side chain that includes a poly(alkylene oxide) moiety and another central silicon is linked to a side chain that includes a carbonate moiety. In Formula IV-E, an organic spacer is positioned between the poly(alkylene oxide) moiety and the silicon. In Formula IV-F, a silicon is linked directly to an oxygen included in a poly(alkylene oxide) moiety.

Formula IV-D:

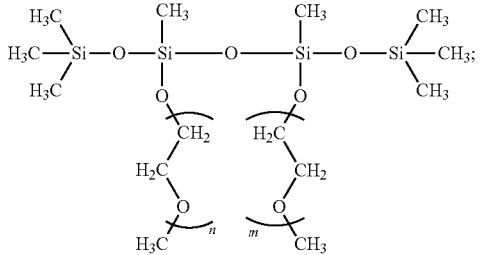

wherein n is 1 to 12.

Formula IV-E:

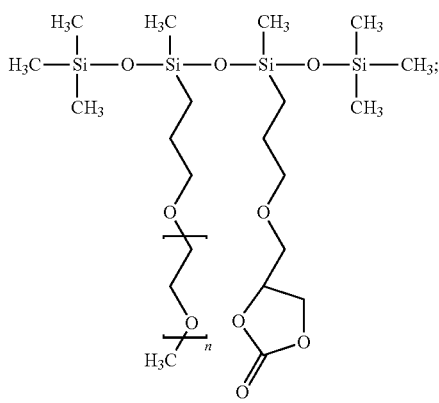

wherein n is 1 to 12.

Formula IV-F:

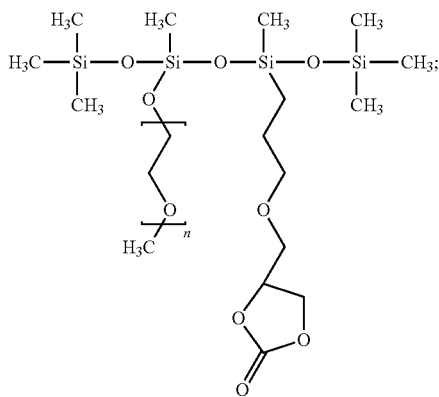

wherein n is 1 to 12.

The solvent can include or consist of one or more trisiloxanes. Trisiloxanes can have a reduced viscosity relative to similarly structured, polysiloxanes and tetrasiloxanes. A suitable trisiloxane has a backbone with three silicons. One or more of the silicons is linked to a first substituent and/or to a second substituent. The first substituent includes a poly(alkylene oxide) moiety and the second substituent includes a cyclic carbonate moiety. Suitable first substituents include side chains or cross links to other trisiloxanes. When the trisiloxanes includes more than one first substituent, each of the first substituents can be the same or different. In one example of the polysiloxane, each of the first substituents is a side chain. Suitable second substituents include side chains. When the trisiloxanes includes more than one second substituent, each of the second substituents can be the same or different. In some instances, the terminal silicons in the backbone are not linked to either a first substituent or a second substituent. The central silicons can be linked to at least one first substituent or to at least one second substituent. In some instances, the trisiloxane excludes second substituents. One or more of the silicons in the backbone of the trisiloxane can be linked to a cross-link to another trisiloxane. The cross-link can include a poly(alkylene oxide) moiety. Examples of suitable trisiloxanes are disclosed in U.S. patent application Ser. No. 11/056,867, filed on Feb. 10, 2005, entitled "Electrochemical Device Having Electrolyte Including Trisiloxane," incorporated herein in its entirety, and U.S. patent application Ser. No. 10/971,913, filed on Oct. 21, 2004, entitled "Electrochemical Device Having Electrolyte Including Trisiloxane," incorporated herein in its entirety, and U.S. Provisional Patent Application Ser. No. 60/543,951, filed on Feb. 11, 2004, entitled "Siloxane," and incorporated herein in its entirety; and U.S. Provisional Patent Application Ser. No. 60/542,017, filed on Feb. 4, 2004, entitled "Nonaqueous Electrolyte Solvents for Electrochemical Devices," and incorporated herein in its entirety; and U.S. Provisional Patent Application Ser. No. 60/543,898, filed on Feb. 11, 2004, entitled "Siloxane Based Electrolytes for Use in Electrochemical Devices," and incorporated herein in its entirety.

A suitable trisiloxane includes a backbone with a first terminal silicon, a central silicon and a second terminal silicon. The first terminal silicons is linked to a first side chain that includes a poly(alkylene oxide) moiety or that includes a cyclic carbonate moiety. The second terminal silicon is linked to a second side chain that includes a poly(alkylene oxide) moiety or that includes a cyclic carbonate moiety. The first side chain and the second side chain can each include a poly(alkylene oxide) moiety or can each include a cyclic carbonate moiety. Alternately, the first side can include a poly(alkylene oxide) moiety and the second side chain can include a cyclic carbonate moiety. In one example, the second side chain includes a cyclic carbonate moiety and the first side chain includes an organic spacer linking a poly(alkylene oxide) moiety to the first terminal silicon.

As the number of substituents that include a poly(alkylene oxide) moiety and/or a cyclic carbonate moiety increase, the viscosity of an electrolyte can increase undesirably and/or the ionic conductivity of an electrolyte can decrease undesirably. As a result, the trisiloxane can include no more than two poly(alkylene oxide) moieties or no more than one poly(alkylene oxide) moiety. Additionally or alternatively, the trisiloxane can include no more than two carbonate moieties or no more than one carbonate moiety. For instance, each of the entities linked to the central silicon can exclude a poly(alkylene oxide) moiety and/or a cyclic carbonate moiety. Additionally or alternatively, the entities linked to the first terminal silicon other than the first side chain and the entities linked to the second terminal silicon other than the second side chain can each exclude a poly(alkylene oxide) moiety and/or a cyclic carbonate moiety. In one example, each of the entities linked to the silicons in the backbone of the trisiloxane other than the first side chain and other than the second side chain exclude both a poly(alkylene oxide) moiety and a cyclic carbonate moiety. Examples of entities that may be linked to the silicons include, but are not limited to, substituents such as side chains, cross-links and halogens.

Formula V provides an example of the trisiloxane. Formula V:

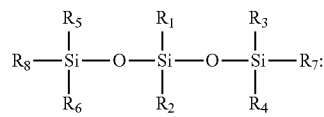

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D.

Formula V-A:

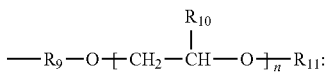

wherein $R_9$ is nil or a spacer; $R_{10}$ is hydrogen; alkyl or aryl; $R_{11}$ is alkyl or aryl; and n is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_9$ is represented by: —$(CH_2)_3$—.

Formula V-B:

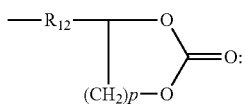

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the trisiloxane. In another example, $R_{12}$ is a alkylene oxide moiety represented by: —$CH_2$—O— with the oxygen linked to a silicon on the backbone of the trisiloxane.

Formula V-C:

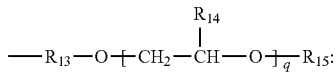

wherein $R_{13}$ is nil or a spacer; $R_{14}$ is hydrogen; alkyl or aryl; $R_{15}$ is alkyl or aryl; and q is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{13}$ is represented by: —$(CH_2)_3$—.

Formula V-D:

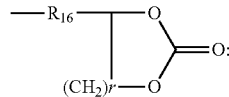

wherein $R_{16}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{16}$ is a bivalent ether moiety represented by: —$CH_2$—O—$(CH_2)_3$— with the —$(CH_2)_3$— linked to a silicon on the backbone of the trisiloxane. In another example, $R_{16}$ is a alkylene oxide moiety represented by: —$CH_2$—O— with the oxygen linked to a silicon on the backbone of the trisiloxane.

One or more of the alkyl and aryl groups specified in Formula V through Formula V-D can be substituted, unsubstituted, halogenated, and/or fluorinated. In one example of a trisiloxane according to Formula V, $R_7$ is represented by Formula V-A with $R_9$ as an organic spacer and $R_8$ is represented by Formula V-C with $R_{13}$ as an organic spacer. In another example of a trisiloxane according to Formula V, $R_7$ is represented by Formula V-A with $R_9$ as nil and $R_8$ is represented by Formula V-C with $R_{13}$ as nil. In another example of a trisiloxane according to Formula V, $R_7$ is represented by Formula V-B and $R_8$ is represented by Formula V-D. In another example of a trisiloxane according to Formula V, $R_7$ is represented by Formula V-A with $R_9$ as an organic spacer and $R_8$ is represented by Formula V-D. In another example of a trisiloxane according to Formula V, $R_7$ is represented by Formula V-A with $R_9$ as an organic spacer and $R_8$ is represented by Formula V-D. In some instances, $R_1$, $R_2$, $R_3$, $R_4$, $R_5$, and $R_6$ is each a methyl group.

Formula V-E through Formula V-H are examples of trisiloxanes according to Formula V. Formula V-E and Formula V-F each illustrate a trisiloxane where each of the terminal silicons are linked to a side chain that includes a poly(ethylene oxide) moiety. Formula V-E illustrates an organic spacer positioned between each poly(ethylene oxide) moiety and the terminal silicon. Formula V-F illustrates each of the terminal silicons linked directly to a poly(ethylene oxide) moiety.

Formula V-E:

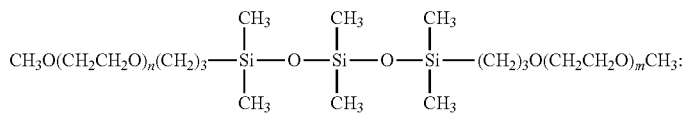

wherein n is 1 to 12 and m is 1 to 12.

Formula V-F:

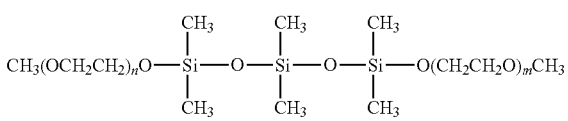

wherein n is 1 to 12 and m is 1 to 12.

Formula V-G and Formula V-H each illustrate a trisiloxane with a terminal silicon linked to a side chain that includes a cyclic carbonate moiety. Formula V-G illustrates one of the terminal silicon linked to a side chain that includes a cyclic carbonate moiety and one of the terminal silicons linked to a side chain that includes a poly(ethylene oxide) moiety. Formula V-H illustrates each of the terminal silicons linked to a side chain that includes a cyclic carbonate moiety.

Formula V-G:

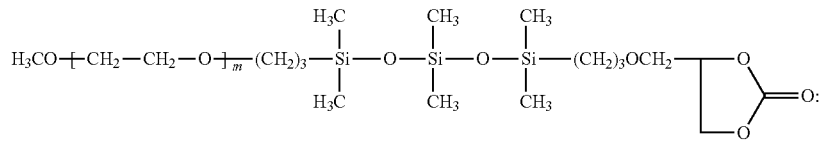

wherein m is 1 to 12.
Formula V-H:

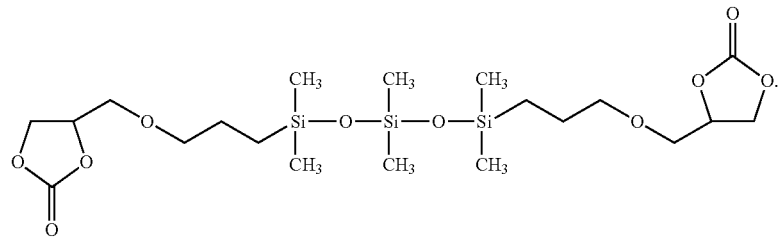 [SMILES: C[Si](C)(CCCOCC1COC(=O)O1)O[Si](C)(C)O[Si](C)(C)CCCOCC1COC(=O)O1]

Another suitable trisiloxane includes a backbone with a first terminal silicon, a central silicon and a second terminal silicon. The central silicon is linked to a central substituent. The central substituent can be a side chain that includes a cyclic carbonate moiety, or that includes a poly(alkylene oxide) moiety linked directly to the central silicon. Alternately, the central substituent can be a cross-link that cross links the trisiloxane to a second siloxane and that includes a poly(alkylene oxide) moiety.

In some instances, the trisiloxane includes not more than two poly(alkylene oxide) moieties or not more than one poly(alkylene oxide) moiety. Additionally or alternately, the trisiloxane can include not more than two carbonate moieties or not more than one carbonate moiety. The entities linked to the first terminal silicon and the entities linked to the second terminal silicon can each exclude a poly(alkylene oxide) moiety and/or each exclude a cyclic carbonate moiety. Additionally or alternately, the entities linked to the central silicon, other than the central substituent, can exclude a poly(alkylene oxide) moiety and/or exclude a cyclic carbonate moiety. In one example, each of the entities linked to the silicons in the backbone of the trisiloxane, other than the central substituent, exclude both a poly(alkylene oxide) moiety and a cyclic carbonate moiety. Examples of entities that may be linked to the silicons include, but are not limited to, substituents such as side chains, halogens and cross-links.

An example of the trisiloxane is represented by the following Formula VI:

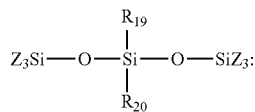

wherein $R_{19}$ is an alkyl group or an aryl group; $R_{20}$ is represented by Formula VI-A, Formula VI-B or Formula VI-C; and the Zs are each an alkyl or an aryl group and can be the same or different.

Formula VI-A:

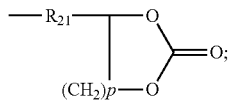

wherein $R_{21}$ is an organic spacer and p is 1 to 2. Suitable organic spacers can include one or more —$CH_2$— groups.

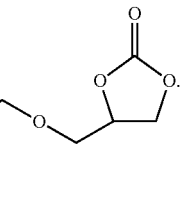

Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{21}$ is a bivalent ether moiety represented by: —$CH_2$—O—$(CH_2)_3$— with the —$(CH_2)_3$— linked to a silicon on the backbone of the trisiloxane. In another example, $R_{21}$ is a alkylene oxide moiety represented by: —$CH_2$—O— with the oxygen linked to a silicon on the backbone of the trisiloxane.

Formula VI-B:

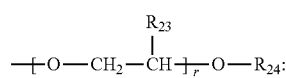

wherein $R_{23}$ is hydrogen; alkyl or aryl; $R_{24}$ is alkyl or aryl; and r is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{22}$ is represented by: —$(CH_2)_3$—.

Formula VI-C:

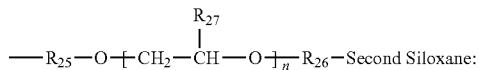

where $R_{25}$ is nil or a spacer; $R_{26}$ is nil or a spacer; $R_{27}$ is hydrogen, alkyl or aryl; second siloxane represents another siloxane and n is 1 to 12. When $R_{25}$ and/or $R_{26}$ is a spacer, the spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. When $R_{26}$ is a spacer, $R_{26}$ can be linked to a silicon in the backbone of the second siloxane. When $R_{26}$ is nil, the poly(ethylene oxide) moiety can be linked to a silicon in the backbone of the second siloxane. The second siloxane can represent another trisiloxane. When the second siloxane is a trisiloxane, $R_{26}$ or the poly(ethylene oxide) moiety can be linked to a central silicon in the backbone of the second trisiloxane.

One or more of the alkyl and aryl groups specified in Formula VI through Formula VI-C can be substituted, unsubstituted, halogenated, and/or fluorinated. In one example of a trisiloxane according to Formula VI, $R_{20}$ is represented by Formula VI-A. In another example of the trisiloxane, $R_{20}$ is represented by Formula VI-B. In another example, $R_{20}$ is represented by Formula VI-C, $R_{25}$ is nil, $R_{26}$ is nil and the poly(ethylene oxide) moiety is linked to a silicon in the backbone of the second siloxane. In another example, $R_{20}$ is represented by Formula VI-C, $R_{25}$ is a spacer, $R_{26}$ is a spacer linked to a silicon in the backbone of the second siloxane. In another example, $R_{25}$ is a spacer with the same structure as $R_{26}$. In another example of a trisiloxane according to Formula VI, $R_{19}$ and each of the Z represent methyl groups.

Formula VI-D through Formula VI-F are examples of trisiloxanes according to Formula VI. Formula VI-D illustrates a trisiloxane where the central silicon is linked to a side chain that includes a poly(ethylene oxide) moiety linked directly to the central silicon.
Formula VI-D:

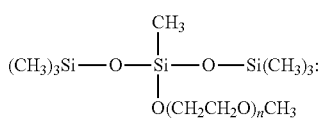

wherein n is 1 to 12.

Formula VI-E and Formula VI-F illustrate trisiloxanes having a central silicon linked to a cross link that includes a poly(ethylene oxide) moiety and that cross-links the trisiloxane to a second trisiloxane. Formula VI-E illustrates the cross link including a spacer positioned between the poly(ethylene oxide) moiety and each of the trisiloxanes. Formula VI-F illustrates a silicon in the backbone of each trisiloxane linked directly to a poly(ethylene oxide) moiety. Formula VI-E:

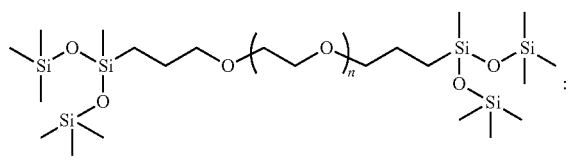

wherein n is 1 to 12. Formula VI-F:

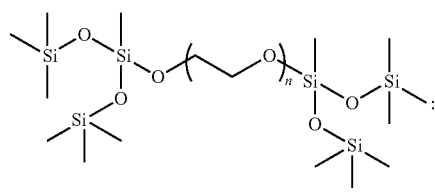

wherein n is 1 to 12.

The solvent can include or consist of one or more disiloxanes. Disiloxanes can have a reduced viscosity relative to similarly structured, polysiloxanes, tetrasiloxanes and trisiloxanes. An example of a suitable disiloxane includes a backbone with a first silicon and a second silicon. The first silicon is linked to one or more first substituents that each include a poly(alkylene oxide) moiety or a cyclic carbonate moiety. The first substituent can be selected from a group consisting of a first side-chain that includes a poly(alkylene oxide) moiety, a first side-chain that includes a cyclic carbonate moiety or a cross link that includes a poly(alkylene oxide) moiety and that cross links the disiloxane to a second siloxane wherein side chains are exclusive of cross links. As the number of substituents that include a poly(alkylene oxide) moiety and/or a cyclic carbonate moiety increase, the viscosity of an electrolyte can increase undesirably and/or the ionic conductivity of an electrolyte can decrease undesirably. As a result, embodiments of the disiloxane include no more than one poly(alkylene oxide) moiety and/or no more than one cyclic carbonate moiety. For instance, the entities linked to the first silicon and the second silicon, other than the first substituent, can each exclude a poly(alkylene oxide) moiety and/or a cyclic carbonate moiety. In some instances, the disiloxane excludes a poly(alkylene oxide) moieties or excludes cyclic carbonate moieties.

The second silicon can be linked to a second substituent selected from a group consisting of a second side-chain that includes a poly(alkylene oxide) moiety, a second side-chain that includes a cyclic carbonate moiety, an aryl group or an alkyl group. In some instances, the second substituent is selected from a group consisting of a second side-chain that includes a poly(alkylene oxide) moiety and a second side-chain that includes a cyclic carbonate moiety. As noted above, the viscosity of an electrolyte can increase undesirably and/or the ionic conductivity of an electrolyte can decrease undesirably as the number of substituents that include a poly(alkylene oxide) moiety and/or a cyclic carbonate moiety increases. As a result, the disiloxanes can include no more than two poly(alkylene oxide) moiety and/or no more than two cyclic carbonate moiety. For instance, the entities linked to the first silicon and the second silicon, in addition to the first substituent and the second substituent, can each exclude a poly(alkylene oxide) moiety and/or a cyclic carbonate moiety.

Examples of suitable disiloxanes are disclosed in U.S. patent application Ser. No. 11/056,866, filed on Feb. 10, 2005, entitled "Electrochemical Device Having Electrolyte Including Disiloxane," and U.S. patent application Ser. No. 10/971,507, filed on Oct. 21, 2004, entitled "Electrochemical Device Having Electrolyte Including Disiloxane," and U.S. Provisional Patent Application Ser. No. 60/543,951, filed on Feb. 11, 2004, entitled "Siloxane," and U.S. Provisional Patent Application Ser. No. 60/542,017, filed on Feb. 4, 2004, entitled "Nonaqueous Electrolyte Solvents for Electrochemical Devices," and U.S. Provisional Patent Application Ser. No. 60/543,898, filed on Feb. 11, 2004, entitled "Siloxane Based Electrolytes for Use in Electrochemical Devices;" each of which is incorporated herein in its entirety.

Formula VII provides an example of a suitable disiloxane.
Formula VII:

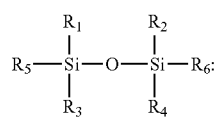

wherein $R_1$ is an alkyl group or an aryl group; $R_2$ is an alkyl group or an aryl group; $R_3$ is an alkyl group or an aryl group;

$R_4$ is an alkyl group or an aryl group; $R_5$ is represented by Formula VII-A, Formula VII-B or Formula VII-C; $R_6$ is an alkyl group, an aryl group, represented by Formula VII-D, or represented by Formula VII-E.

Formula VVI-A:

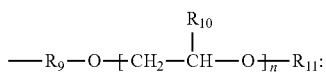

wherein $R_9$ is nil or a spacer; $R_{10}$ is hydrogen; alkyl or aryl; $R_{11}$ is alkyl or aryl; and n is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_9$ is represented by: —$(CH_2)_3$—.

Formula VII-B:

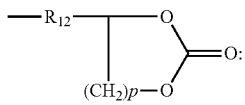

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the disiloxane. In another example, $R_{12}$ is a alkylene oxide moiety represented by: —$CH_2$—O— with the oxygen linked to a silicon on the backbone of the disiloxane.

Formula VII-C:

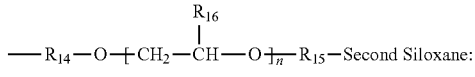

where $R_{14}$ is nil or a spacer; $R_{15}$ is nil or a spacer; $R_{16}$ is hydrogen, alkyl or aryl; second siloxane represents another siloxane and n is 1 to 12. The spacers can be organic spacers and can include one or more —$CH_2$— groups. Other suitable spacers can include an alkylene, alkylene oxide or a bivalent ether group. These spacers can be the same or different and can be substituted or unsubstituted. The above spacers can be completely or partially halogenated. For instance, the above spacers can be completely or partially fluorinated. In one example, $R_{14}$ and $R_{15}$ are each represented by: —$(CH_2)_3$—.

Formula VII-D:

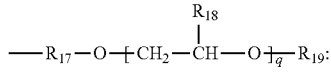

wherein $R_{17}$ is nil or a spacer; $R_{18}$ is hydrogen; alkyl or aryl; $R_{19}$ is alkyl or aryl; and q is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{17}$ is represented by: —$CH_2$—O—$(CH_2)_3$— with the —$(CH_2)_3$— linked to a silicon on the backbone of the disiloxane.

Formula VII-E:

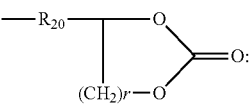

wherein $R_{20}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{20}$ is a bivalent ether moiety represented by: —$CH_2$—O—$(CH_2)_3$— with the —$(CH_2)_3$— linked to a silicon on the backbone of the disiloxane. In another example, $R_{20}$ is a alkylene oxide moiety represented by: —$CH_2$—O— with the oxygen linked to a silicon on the backbone of the disiloxane.

In the disiloxanes illustrated in Formula VII: $R_5$ can represent Formula VII-A or Formula VII-B; or $R_5$ can represent Formula VII-A or Formula VII-C; or $R_5$ can represent Formula VII-B or Formula VII-C. Additionally or alternately: $R_6$ can represent an alkyl group or an aryl group or Formula VII-D; $R_6$ can represent an alkyl group or an aryl group or Formula VII-E. In some instances, $R_1$, $R_2$, $R_3$ and $R_4$ are each an alkyl group. For instance, $R_1$, $R_2$, $R_3$ and $R_4$ can each be a methyl group.

In one example of the disiloxane, the first substituent is a side chain that includes a poly(alkylene oxide) moiety. The poly(alkylene oxide) moiety can include an oxygen linked directly to the first silicon. For instance, the disiloxanes can be represented by Formula VII with $R_5$ represented by Formula VII-A and $R_9$ as nil. Alternately, a spacer can link the poly(alkylene oxide) moiety to the first silicon. For instance, the disiloxanes can be represented by Formula VII with $R_5$ represented by Formula VII-A and $R_9$ as a divalent organic moiety.

When the first substituent is a side chain that includes a poly(alkylene oxide) moiety, each of the entities linked to the second silicon can be alkyl groups and/or aryl groups. For instance, the second substituent can be an alkyl group or an aryl group. The disiloxanes can be represented by Formula VII with $R_5$ represented by Formula VII-A and $R_6$ as an alkyl group or an aryl group. Formula VII-F provides an example of the disiloxane. Formula VII-F:

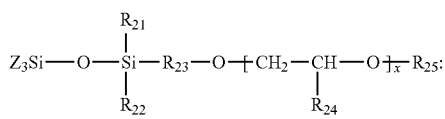

where $R_{21}$ is an alkyl group or an aryl group; $R_{22}$ is an alkyl group or an aryl group; $R_{23}$ is nil or a spacer; $R_{24}$ is a hydrogen atom or an alkyl group; $R_{25}$ is an alkyl group; Z is an alkyl or an aryl group and the Zs can be the same or different and x is from 1 to 30. The spacer can be an organic spacer and can include one or more —CH$_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, R$_{23}$ has a structure according to: —(CH$_2$)$_3$—. In another example, the Zs, R$_{21}$, R$_{22}$ and R$_{25}$ are each a methyl group. In a preferred example, the Zs, R$_{21}$, R$_{22}$ and R$_{25}$ are each a methyl group, R$_{23}$ has a structure according to: —(CH$_2$)$_3$— and R$_{24}$ is a hydrogen. In a more preferred example, the Zs, R$_{21}$, R$_{22}$ and R$_{25}$ are each a methyl group, R$_{23}$ has a structure according to: —(CH$_2$)$_3$—; R$_{24}$ is a hydrogen; and x is 3. A preferred example of the disiloxane is provided in the following Formula VII-G:

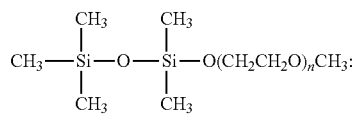

wherein n is 1 to 12. A particularly preferred disiloxane is represented by Formula VII-G with n=3.

When the first substituent is a side chain that includes a poly(alkylene oxide) moiety, the second substituent can be a side chain that includes a poly(alkylene oxide) moiety. For instance, the disiloxane can be represented by Formula VII with R$_5$ represented by Formula VII-A and R$_6$ represented by Formula VII-D. An example of the disiloxanes is provided in the following Formula VII-H:

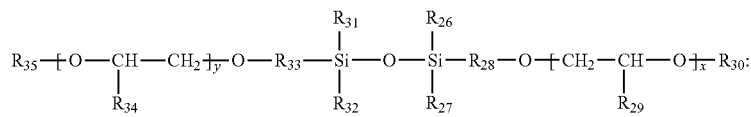

wherein R$_{26}$ is an alkyl group or an aryl group; R$_{27}$ is an alkyl group or an aryl group; R$_{28}$ is nil or a spacer; R$_{29}$ is a hydrogen atom or an alkyl group; R$_{30}$ is an alkyl group; R$_{31}$ is an alkyl group or an aryl group; R$_{32}$ is an alkyl group or an aryl group; R$_{33}$ is nil or a spacer; R$_{34}$ is a hydrogen atom or an alkyl group; R$_{35}$ is an alkyl group; x is from 1 to 30 and y is from 1 to 30. R$_{28}$ and R$_{33}$ can be the same or different. Each spacer can be an organic spacer and can include one or more —CH$_2$— groups. Other suitable spacers can include an alkylene, alkylene oxide or bivalent ether. These spacers can be substituted or unsubstituted. The above spacers can be completely or partially halogenated. For instance, the above spacers can be completely or partially fluorinated. In one example, R$_{28}$ and R$_{33}$ each has a structure according to: —(CH$_2$)$_3$—. In another example, R$_{26}$, R$_{27}$, R$_{31}$, and R$_{32}$ are each an alkyl group. In another example, R$_{26}$, R$_{27}$, R$_{30}$, R$_{31}$, R$_{32}$, and R$_{35}$ are each a methyl group. In another example, R$_{30}$ and R$_{35}$ have the same structure, R$_{29}$ and R$_{34}$ have the same structure, R$_{28}$ and R$_{33}$ have the same structure and R$_{26}$, R$_{27}$, R$_{31}$, and R$_{32}$ have the same structure. A preferred example of the disiloxane is presented in Formula VII-J:

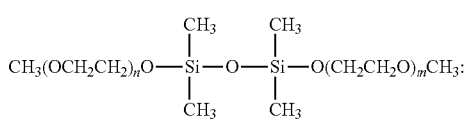

wherein n is 1 to 12 and m is 1 to 12. A particularly preferred disiloxane is represented by Formula VII-J with n=3 and m=3.

When the first substituent is a side chain that includes a poly(alkylene oxide) moiety, the second substituent can be a side chain that includes a cyclic carbonate moiety. For instance, the disiloxane can be represented by Formula VII with R$_5$ represented by Formula VII-A and R$_6$ represented by Formula VII-E.

In another example of the disiloxane, the first substituent cross links the disiloxane to a second siloxane and includes a poly(alkylene oxide) moiety. The poly(alkylene oxide) moiety can include an oxygen linked directly to the first silicon. For instance, the disiloxane can be represented by Formula VII with R$_5$ represented by Formula VII-C and R$_{14}$ as nil. In some instances, the poly(alkylene oxide) moiety also includes a second oxygen liked directly to the backbone of the second siloxane. For instance, the disiloxane can be represented by Formula VII with R$_5$ represented by Formula VII-C, R$_{14}$ as nil, and R$_{15}$ as nil. Alternately, a spacer can link the poly(alkylene oxide) moiety to the first silicon. For instance, the disiloxanes can be represented by Formula VII with R$_5$ represented by Formula VII-A and R$_{14}$ as a divalent organic moiety. In some instances, the poly(alkylene oxide) moiety also includes a second spacer linking the poly(alkylene oxide) moiety to the backbone of the second siloxane. For instance, the disiloxane can be represented by Formula VII with R$_5$ represented by Formula VII-C, R$_{14}$ as a divalent organic moiety, and R$_{15}$ as a divalent organic moiety.

When the first substituent cross links the disiloxane to a second siloxane and includes a poly(alkylene oxide) moiety, each of the entities linked to the second silicon can be an aryl group or an alkyl group. For instance, the second substituent can be an alkyl group or an aryl group. The disiloxanes can be represented by Formula VII with R$_5$ represented by Formula VII-C and R$_6$ as an alkyl group or an aryl group. Formula VII-K provides an example of the disiloxane where the poly (alkylene oxide) moiety includes an oxygen linked directly to the first silicon. Formula VII-K:

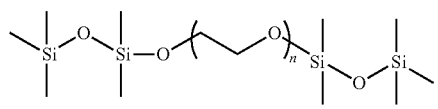

wherein n is 1 to 12. Formula VII-L provides an example of the disiloxane where an organic spacer is positioned between the poly(alkylene oxide) moiety and the first silicon. Formula VII-L:

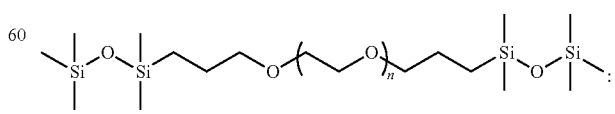

wherein n is 1 to 12.

When the first substituent cross links the disiloxane to a second siloxane and includes a poly(alkylene oxide) moiety, the second substituent can be a side chain that includes a poly(alkylene oxide) moiety. For instance, the disiloxanes can be represented by Formula VII with $R_5$ represented by Formula VII-C and $R_6$ represented by Formula VII-D.

When the first substituent cross links the disiloxane to a second siloxane and includes a poly(alkylene oxide) moiety, the second substituent can be a side chain that includes a cyclic carbonate moiety. For instance, the disiloxanes can be represented by Formula VII with $R_5$ represented by Formula VII-C and $R_6$ represented by Formula VII-E.

In another example of the disiloxane, the first substituent is a side chain that includes a cyclic carbonate moiety. For instance, the disiloxane can be represented by Formula VII with $R_5$ represented by Formula VII-B.

When the first substituent is a side chain that includes a cyclic carbonate moiety, each of the entities linked to the second silicon can be an aryl group or an alkyl group. For instance, the second substituent can be an alkyl group or an aryl group. The disiloxane can be represented by Formula VII with $R_5$ represented by Formula VII-B and with $R_6$ as an alkyl group or an aryl group. A preferred example of the disiloxane is presented by the following Formula VII-M:

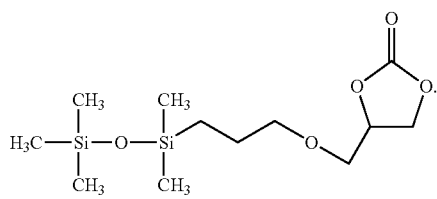 [SMILES: C[Si](C)(C)O[Si](C)(C)CCCOCC1COC(=O)O1]

When the first substituent is a side chain that includes a cyclic carbonate moiety, the second substituent can be a side chain that includes a cyclic carbonate moiety. For instance, the disiloxane can be represented by Formula VII with $R_5$ represented by Formula VII-B and $R_6$ represented by Formula VII-E. The structure of the first substituent can be the same as the structure of the second substituent or can be different from the structure of the second substituent. A preferred example of the disiloxane is presented by the following Formula VII-N:

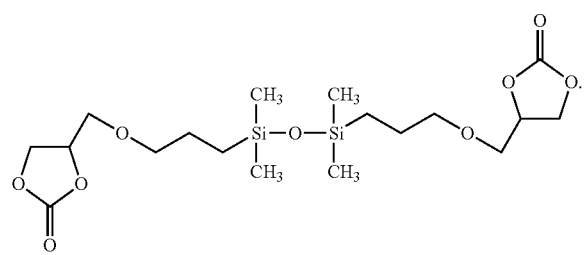 [SMILES: C[Si](C)(CCCOCC1COC(=O)O1)O[Si](C)(C)CCCOCC1COC(=O)O1]

The electrolyte can include a single disiloxane and none or more other siloxanes. Alternately, the electrolyte can include two or more disiloxanes and none or more other siloxanes. Examples of other suitable siloxanes include, but are not limited to, the trisiloxanes, tetrasiloxanes, pentasiloxanes, oligosiloxanes or polysiloxanes disclosed above. In some instances, at least one of the two or more disiloxanes is chosen from those represented by Formula VII through Formula VII-N. Alternately, each of the disiloxanes can be chosen from those represented by Formula VII through Formula VII-N.

The solvent can include or consist of one or more silanes. An example of the silane includes a silicon linked to one or more first substituents that each include a poly(alkylene oxide) moiety or a cyclic carbonate moiety. When a first substituent includes a poly(alkylene oxide) moiety, the poly(alkylene oxide) moiety can include an oxygen linked directly to the silicon. Alternately, the first substituent can include a spacer positioned between the poly(alkylene oxide) moiety and the silicon. Suitable spacers include, but are not limited to, organic spacers. In some instances, the poly(alkylene oxide) moiety is a poly(ethylene oxide) moiety. In some instances, the poly(alkylene oxide) moiety is an oligo(alkylene oxide) moiety having from 1 to 15 alkylene oxide units. Examples of suitable silanes are disclosed in U.S. patent application Ser. No. 11/056,869, filed on Feb. 10, 2005, and entitled "Electrolyte Including Silane for Use in Electrochemical Devices;" and U.S. patent application Ser. No. 10/977,313, filed on Oct. 28, 2004, entitled "Electrolyte Including Silane for Use in Electrochemical Devices;" and in U.S. Provisional Patent Application Ser. No. 60/601,452, filed on Aug. 13, 2004, entitled "Electrolyte Including Silane for Use in Electrochemical Devices" each of which is incorporated herein in its entirety.

The silane can include only one of the first substituents linked to a silicon or a plurality of the first substituents linked to the silicon. When the silane includes a plurality of the first substituents, the silane can include two of the first substituents, three of the first substituents or four of the first substituents. When the silane includes fewer than four first substituents, the additional substituent(s) linked to the silicon are second substituents that each exclude a poly(alkylene oxide) moiety and a cyclic carbonate moiety. Suitable second substituents include, but are not limited to, alkyl groups, aryl groups and halogens. When the silane includes a plurality of first substituents, the first substituents can each be the same or can be different. In one example, the silane includes a plurality of the first substituents and each of the first substituents is different. Alternately, the silane includes a plurality of the first substituents and a portion of the first substituents is different from another portion of the first substituents.

Examples of the first substituents include: a side-chain that includes a poly(alkylene oxide) moiety; a side-chain that includes a cyclic carbonate moiety; and a cross link that includes a poly(alkylene oxide) moiety and that cross-links the silane to a second silane where a cross link is exclusive of a side chain. Accordingly, the silane can include one or more side-chains that each include a poly(alkylene oxide) moiety and/or one or more side-chains that each include a cyclic carbonate moiety and/or one or more cross links that each include a poly(alkylene oxide) moiety and that each cross-link the silane to a second silane.

In one example, the silane includes a silicon linked to one or more side-chains that each include a poly(alkylene oxide) moiety and linked to one or more second substituents. In another example, the silane includes a silicon linked to one or more side-chains that each include a cyclic carbonate moiety and linked to one or more second substituents. In another example, the silane includes a silicon linked to one or more cross links that each include a poly(alkylene oxide) moiety and linked to one or more second substituents.

In an example, the silane includes a silicon linked to one or more side-chains that each include a poly(alkylene oxide) moiety; to one or more side-chains that each include a cyclic carbonate moiety; and to one or more second substituents. In another example, the silane includes a silicon linked to one or more side-chains that each include a cyclic carbonate moiety; to one or more cross links that each include a poly(alkylene oxide) moiety; and to one or more second substituents. In another example, the silane includes a silicon linked to one or more side-chains that each include a poly(alkylene oxide) moiety; to one or more cross links that each include a poly(alkylene oxide) moiety; and to one or more second substituents.

In one example, the silane includes a silicon linked to four side-chains that each include a poly(alkylene oxide) moiety. Accordingly, the silane can exclude cyclic carbonate moieties. In another example, the silane includes a silicon linked to four side-chains that each include a cyclic carbonate moiety. Accordingly, the silane can exclude poly(alkylene oxide) moieties. In another example, the silane includes a silicon linked to four cross links that each include a poly(alkylene oxide) moiety.

An example of the silane includes a silicon linked to one or more first substituents that each include a poly(alkylene oxide) moiety or a cyclic carbonate moiety. When a first substituent includes a poly(alkylene oxide) moiety, the poly(alkylene oxide) moiety can include an oxygen linked directly to the silicon. Alternately, the first substituent can include a spacer positioned between the poly(alkylene oxide) moiety and the silicon. Suitable spacers include, but are not limited to, organic spacers. In some instances, the poly(alkylene oxide) moiety is a poly(ethylene oxide) moiety. In some instances, the poly(alkylene oxide) moiety is an oligo(alkylene oxide) moiety having from 1 to 15 alkylene oxide units.

The silane can include only one of the first substituents linked to a silicon or a plurality of the first substituents linked to the silicon. When the silane includes a plurality of the first substituents, the silane can include two of the first substituents, three of the first substituents or four of the first substituents. When the silane includes fewer than four first substituents, the additional substituent(s) linked to the silicon are second substituents that each exclude a poly(alkylene oxide) moiety and a cyclic carbonate moiety. Suitable second substituents include, but are not limited to, alkyl groups, aryl groups and halogens. When the silane includes a plurality of first substituents, the first substituents can each be the same or can be different. In one example, the silane includes a plurality of the first substituents and each of the first substituents is different. Alternately, the silane includes a plurality of the first substituents and a portion of the first substituents is different from another portion of the first substituents.

Examples of the first substituents include: a side-chain that includes a poly(alkylene oxide) moiety; a side-chain that includes a cyclic carbonate moiety; and a cross link that includes a poly(alkylene oxide) moiety and that cross-links the silane to a second silane where a cross link is exclusive of a side chain. Accordingly, the silane can include one or more side-chains that each include a poly(alkylene oxide) moiety and/or one or more side-chains that each include a cyclic carbonate moiety and/or one or more cross links that each include a poly(alkylene oxide) moiety and that each cross-link the silane to a second silane.

In one example, the silane includes a silicon linked to one or more side-chains that each include a poly(alkylene oxide) moiety and linked to one or more second substituents. In another example, the silane includes a silicon linked to one or more side-chains that each include a cyclic carbonate moiety and linked to one or more second substituents. In another example, the silane includes a silicon linked to one or more cross links that each include a poly(alkylene oxide) moiety and linked to one or more second substituents.

In an example, the silane includes a silicon linked to one or more side-chains that each include a poly(alkylene oxide) moiety; to one or more side-chains that each include a cyclic carbonate moiety; and to one or more second substituents. In another example, the silane includes a silicon linked to one or more side-chains that each include a cyclic carbonate moiety; to one or more cross links that each include a poly(alkylene oxide) moiety; and to one or more second substituents. In another example, the silane includes a silicon linked to one or more side-chains that each include a poly(alkylene oxide) moiety; to one or more cross links that each include a poly(alkylene oxide) moiety; and to one or more second substituents.

In one example, the silane includes a silicon linked to four side-chains that each include a poly(alkylene oxide) moiety. Accordingly, the silane can exclude cyclic carbonate moieties. In another example, the silane includes a silicon linked to four side-chains that each include a cyclic carbonate moiety. Accordingly, the silane can exclude poly(alkylene oxide) moieties. In another example, the silane includes a silicon linked to four cross links that each include a poly(alkylene oxide) moiety.

A suitable silane can be represented by the following Formula VIII: $SiR_{4-x-y}R'_xR''_y$; wherein R is a second substituent and an alkyl group, an aryl group or a halogen, $R'_x$ is a first substituent that includes a poly(alkylene oxide) moiety and can be represented by Formula VIII-A or Formula VIII-C, $R''_y$ is a first substituent that includes a cyclic carbonate moiety and can be represented by Formula VIII-B, x indicates the number of R' substituents included in the silane and is 0 to 4, y indicates the number of R'' substituents included in the silane is 0 to 4, 4-x-y indicates the number of R substituents, and x+y is at least 1.

Formula VIII-A:

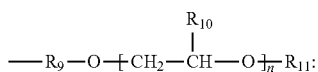

wherein $R_9$ is nil or an organic spacer; $R_{10}$ is hydrogen; alkyl or aryl; $R_{11}$ is alkyl or aryl; and n is 1 to 15. The spacer can be an organic spacer and can include one or more —$CH_2$— groups. Other suitable spacers can include an alkylene, alkylene oxide or a bivalent ether group. These spacers can be substituted or unsubstituted. In one example, $R_9$ is represented by: —$(CH_2)_3$—.

Formula VIII-B:

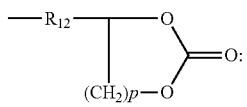

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the silane. In another example, $R_{12}$ is an alkylene oxide moiety represented by: —$CH_2$—O— with the oxygen linked to a silicon on the backbone of the silane.

Formula VIII-C:

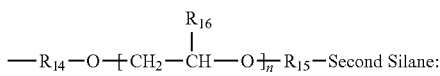

where $R_{14}$ is nil or a spacer; $R_{15}$ is nil or a spacer; $R_{16}$ is hydrogen, alkyl or aryl; second silane represents another silane and n is 1 to 15. The spacers can be organic spacers and can include one or more —$CH_2$— groups. Other suitable spacers can include an alkylene, alkylene oxide or a bivalent ether group. These spacers can be the same or different and can be substituted or unsubstituted. In one example, $R_{14}$ and $R_{15}$ are each represented by: —$(CH_2)_3$—. The second silane can be represented by: —$SiR_{3-p-q}R'_pR''_q$, wherein R are each an alkyl group or an aryl group, R' is a substituent that includes a poly(alkylene oxide) moiety and can be represented by Formula VIII-A or Formula VIII-C, R" is a substituent that includes a cyclic carbonate moiety and can be represented by Formula VIII-B, p is the number of R' substituents included on the second silane and is 0 to 3, q is the number of R" substituents included on the second silane, 3-p-q is the number of R substituents, and is 0 to 3. In one example, p is 0 and q is 0. In another example, p+q is greater than or equal to 1. In yet another example, p is greater than or equal to 1. In still another example, q is greater than or equal to 1. In another example, R' is represented by Formula VIII-A and R" is represented by Formula VIII-B, p is 0 to 3 and q is 0 to 3.

One or more of the alkyl and aryl groups specified in Formula VIII through Formula VIII-C can be substituted, unsubstituted, halogenated, and/or fluorinated. When the silane includes more than one substituent represented by Formula VIII-A, the entities can be the same or different. When the silane includes more than one substituent represented by Formula VIII-B, the entities can be the same or different. When the silane includes more than one substituent represented by Formula VIII-C, the entities can be the same or different.

In one example of the silane according to Formula VIII, x=0. In another example, x is 1 to 3. In another example, y=0. In still another example, y is 1 to 3. In another example, x+y=4 or x+y=2.

In some instances, R' is represented by Formula VIII-A, x is greater than 0, and $R_9$ is nil. In other instances, R' is represented by Formula VIII-A and $R_9$ is an organic spacer. In an example, R" is represented by Formula VIII-B and y is greater than 0. In another example, R' is represented by Formula VIII-C, x is greater than 0, $R_{14}$ is nil and $R_{15}$ is nil. In still another example, R' is represented by Formula VIII-C, x is greater than 0, $R_{14}$ is an organic spacer and $R_{15}$ is an organic spacer.

When the silane includes more than one substituent represented by Formula VIII-A, the entities can be the same or different. When the silane includes more than one substituent represented by Formula VIII-B, the entities can be the same or different. When the silane includes more than one substituent represented by formula VIII-C, the entities can be the same or different.

A preferred silane includes a silicon linked to one side chain that includes a poly(alkylene oxide) moiety and linked to three second substituents. For instance, the silane can be represented by Formula VIII with x=1, y=0 and the R' represented by Formula VIII-A. Formula VIII-D presents an example of the silane that includes a silicon linked to one side chain that includes a poly(ethylene oxide) moiety, and linked to three alkyl groups. The poly(ethylene oxide) moiety of Formula VIII-D includes an oxygen liked directly to the silicon. Formula VIII-D:

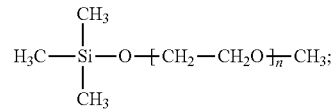

wherein n is 1 to 15. In a preferred silane according to Formula VIII-D, n=3. Formula VIII-E presents an example of the silane that includes a silicon linked to one side chain that includes a poly(alkylene oxide) moiety, and linked to three alkyl groups. The side chain of Formula VIII-E includes an organic spacer positioned between the silicon and the poly(ethylene oxide) moiety. Formula VIII-E:

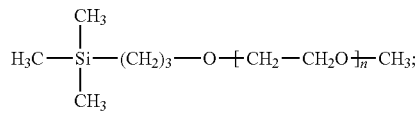

wherein n is 1 to 15. In a preferred silane according to Formula VIII-E, n=3. Formula VIII-F presents another example of the silane that includes a silicon linked to one side chain that includes a poly(alkylene oxide) moiety, and linked to three alkyl groups. The side chain of Formula VIII-F includes an organic spacer positioned between the silicon and the poly(alkylene oxide) moiety. Formula VIII-F:

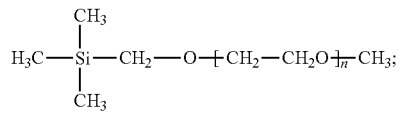

wherein n is 1 to 15. In a preferred silane according to Formula VIII-F, n=3.

A preferred silane includes a silicon linked to two side chains that each include a poly(alkylene oxide) moiety and linked to two second substitutents. For instance, the silane can be represented by Formula VIII with x=2 and y=0. One or both R' can be represented by Formula VIII-A. One or both R' can be represented by Formula VIII-C. In some instances, one R' is represented by Formula VIII-A and one R' is represented by Formula VIII-C. Formula VIII-G is an example of the silane that includes a silicon linked to two side chains that each include a poly(ethylene oxide) moiety and linked to two alkyl groups. Formula VIII-G:

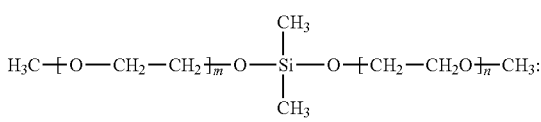

wherein m is 1 to 15, n is 1 to 15 and m can be different from n or the same as n. In a preferred silane according to Formula VIII-G, m=3 and n=3. Formula VIII-H is an example of the silane that includes a silicon linked to two side chains that each include a poly(ethylene oxide) moiety, and linked to an alkyl group, and linked to an aryl group.

Formula VIII-H:

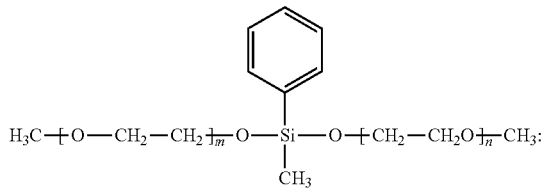

wherein m is 1 to 15, n is 1 to 15 and m can be different from n or the same as n. In a preferred silane according to Formula VIII-H, m=3 and n=3.

Another preferred silane includes a silicon linked to one side chain that includes a cyclic carbonate moiety and linked to three second substituents. For instance, the silane can be represented by Formula VIII with x=0 and y=1. Formula VIII-J is a preferred example of the silane that includes a silicon linked to a side chain that includes a cyclic carbonate moiety and linked to three alkyl groups. Formula VIII-J:

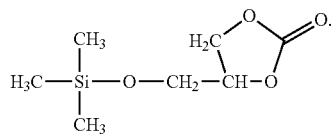

Another preferred silane includes a silicon linked to a cross link that includes a poly(alkylene oxide) moiety and linked to three second substituents. For instance, the silane can be represented by Formula VIII with x=1, y=0 and the R' represented by Formula VIII-C. Formula VIII-K is a preferred example of the silane that includes a silicon linked to a cross link that includes a poly(alkylene oxide) moiety and linked to three alkyl groups. The poly(alkylene oxide) moiety of Formula VIII-K includes an oxygen liked directly to the silicon of each silane. Formula VIII-K:

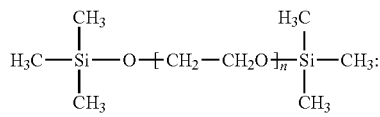

wherein n is 1 to 15. In a preferred silane according to Formula VIII-K, n=4.

The electrolyte can include a single silane. Alternately, the electrolyte can include a plurality of silanes. When the electrolyte includes a plurality of silanes, at least one of the silanes can be chosen from those represented by Formula VIII through Formula VIII-K. Alternately, each of the silanes can be chosen from those represented by Formula VIII through Formula VIII-K. In some instances, the electrolyte includes a silane that excludes poly(alkylene oxide) moieties and a silane that excludes cyclic carbonate moieties. For instance, the electrolyte can include a silane that includes one or more poly(alkylene oxide) moieties and a silane that excludes poly (alkylene oxide) moieties. Alternately, the electrolyte can include a silane that includes one or more cyclic carbonate moieties and a silane that excludes cyclic carbonate moieties. In a preferred example, the electrolyte includes a blend of a silane according to Formula VIII-J and a silane according to Formula VIII-F. In another preferred example, the electrolyte includes a blend of a silane according to Formula VIII-J and a silane according to Formula VIII-D.

In some instances, the solvent includes more than one of the siloxanes or more than one of the silanes. Further, the solvent can include one or more siloxanes combined with one or more silanes. The combination of a silane with other silanes and/or with other siloxanes can reduce the viscosity of the blended solvent. Additionally, the inventors believe that the silanes can improve the mobility of poly(alkylene oxide) in other siloxanes or silanes. Additionally, the combination of a silane with other silanes and/or siloxanes can increase the ability of the solvent to dissociate the salts employed in electrolyte and can accordingly increase the concentration of free ions in the electrolyte. These features can further enhance the ionic conductivity of the electrolytes.

The above siloxanes and silanes can be generated by employing nucleophilic substitutions, hydrosilylation and/or dehydrogenation reactions. Methods for generating the silanes and siloxanes can be found in U.S. patent application Ser. No. 10/810,019, filed on Mar. 25, 2004, entitled "Polysiloxane for Use in Electrochemical Cells;" U.S. Provisional Patent Application Ser. No. 60/543,951, filed on Feb. 11, 2004, entitled "Siloxane;" U.S. Provisional Patent Application Ser. No. 60/542,017, filed on Feb. 4, 2004, entitled "Non-aqueous Electrolyte Solvents for Electrochemical Devices," and incorporated herein in its entirety; and U.S. Provisional Patent Application Ser. No. 60/543,898, filed on Feb. 11, 2004, entitled "Siloxane Based Electrolytes for Use in Electrochemical Devices," and incorporated herein in its entirety; and U.S. Provisional Patent Application Ser. No. 60/601,452, filed on Aug. 13, 2004, entitled "Electrolyte Including Silane for Use in Electrochemical Devices," and incorporated herein in its entirety.

The solvent includes one or more organic solvents in addition to the one or more of the silanes and/or in addition to the one or more of the siloxanes. Examples of suitable organic solvents include, but are not limited to, cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate, aliphatic carboxylate esters such as methyl formate, methyl acetate and ethyl propionate, gamma.-lactones such as .gamma.-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-dimethyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters. In some instances, the solvent includes a combination of two or more of the above organic solvents.

The electrolyte can optionally include one or more additives that form a passivation layer on the anode. It is believed that, in some instances, the passivation layer formed by these additives can further reduce dendrite formation on anodes that contain lithium metal, lithium metal alloys and/or lithium metal intermetallic compounds. The additives can be reduced and/or polymerize at the surface of the anode to form the passivation layer. Vinyl ethylene carbonate (VEC) and vinyl carbonate (VC) are examples of additives that can form a passivation layer by being reduced and polymerizing to form a passivation layer. When they see an electron at the surface of a carbonaceous anode, they are reduced to $Li_2CO_3$ and butadiene that polymerizes at the surface of the anode. Ethylene sulfite (ES) and propylene sulfite (PS) form passivation layers by mechanisms that are similar to VC and VEC. In some instances, one or more of the additives has a reduction potential that exceeds the reduction potential of the components of the solvent. For instance, VEC and VC have a reduction potential of about 2.3V vs. $Li/Li^+$. This arrangement of reduction potentials can encourage the additive to form the passivation layer before reduction of other electrolyte components and can accordingly reduce consumption of other electrolyte components.

Suitable additives include, but are not limited to, carbonates having one or more unsaturated substituents. For instance, suitable additives include unsaturated and unsubstituted cyclic carbonates such as vinyl carbonate (VC); cyclic alkylene carbonates having one or more unsaturated substituents such as vinyl ethylene carbonate (VEC), and o-phenylene carbonate (CC, $C_7H_4O_3$); cyclic alkylene carbonates having one or more halogenated alkyl substituents such as ethylene carbonate substituted with a trifluormethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (ClEC). Other suitable additives include, acetates having one or more unsaturated substituents such as vinyl acetate (VA). Other suitable additives include cyclic alkyl sulfites and linear sulfites. For instance, suitable additives include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more alkyl substituents and dialkyl sulfites such as dimethyl sulfite (DMS) and diethyl sulfite (DES). Other suitable additives include halogenated-gamma-butyrolactones such as bromo-gamma-butyrolactone (BrGBL) and fluoro-gamma-butyrolactone (FGBL).

The additives can include or consist of one or more additives selected from the group consisting of: dimethyl sulfite (DMS), diethyl sulfite (DES), bromo-gamma-butyrolactone (BrGBL), fluoro-gamma-butyrolactone (FGBL), vinyl carbonate (VC), vinyl ethylene carbonate (VEC), ethylene sulfite (ES), CC, trifluoropropylene carbonate (TFPC), 2-propenyl ethyl carbonate, fluoroethylene carbonate (FEC), chloroethylene carbonate (ClEC), vinyl acetate (VA), propylene sulfite (PS), 1,3 dimethyl butadiene, styrene carbonate, phenyl ethylene carbonate (PhEC), aromatic carbonates, vinyl pyrrole, vinyl piperazine, vinyl piperidine, vinyl pyridine, and mixtures thereof. In another example, the electrolyte includes or consists of one or more additives selected from the group consisting of vinyl carbonate (VC), vinyl ethylene carbonate (VEC), ethylene sulfite (ES), propylene sulfite (PS), and phenyl ethylene carbonate (PhEC). In a preferred example, the electrolyte includes or consists of one or more additives selected from the group consisting of vinyl carbonate (VC), vinyl ethylene carbonate (VEC), ethylene sulfite (ES), and propylene sulfite (PS). In another preferred example, the electrolyte includes vinyl carbonate (VC) and/or vinyl ethylene carbonate (VEC).

As noted, certain organoborate salts such as LiDfOB, can form a passivation layer. As a result, the desirability and/or concentration of additives may be reduced when organoborate are employed as salts. In some instances, additives are employed when the solvent excludes organoborate salts.

One example of the electrolyte includes a silane and/or a siloxane; one or more organic solvents; one or more salts selected from a group consisting of $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, Li-methide, Li-imide and lithium alkyl fluorophosphates, and at least one anode that includes one or more components selected from a group consisting of lithium metal, a lithium metal alloy or a lithium metal intermetallic compound. In some instances, the example solvent excludes an organoborate salt.

In some instances, the concentration of additives in the electrolyte generally does not greatly exceed the concentration needed to form the passivation layer. As a result, the additives are generally present in smaller concentrations than salts. A suitable concentration for an additive in the electrolyte includes, but is not limited to, concentrations greater than 0.1 wt %, greater than 0.5 wt % and/or less than 5 wt %, less than 20 wt %, or less than 35 wt % where each of the wt % refers to the percentage of the total weight of solvent plus additive. In a preferred embodiment, the concentration of the additive is less than 3 wt % or less than 2 wt %.

The electrolyte can be a liquid. In some instances, the electrolyte is a solid or a gel. For instance, the electrolyte can include a network polymer that interacts with the solvent to form an interpenetrating network. The interpenetrating network can serve as a mechanism for providing a solid electrolyte or gel electrolyte. Alternately, the electrolyte can include one or more solid polymers that are each a solid at room temperature when standing alone. The solid polymer can be employed in conjunction with the solvent to generate an electrolyte such as a plasticized electrolyte as a solid or as a gel. Alternately, one or more silanes and/or one or more siloxanes in the solvent can be cross linked to provide a solid or gel electrolyte. A polysiloxane is an example of a cross-linkable solvent. Suitable examples for method of forming a cross linked polymer are disclosed in U.S. patent application Ser. No. 10/810,019, filed on Mar. 25, 2004, entitled "Polysiloxane for Use in Electrochemical Cells" and incorporated herein in its entirety.

The battery can be a primary battery or a secondary battery. Further, the above cathode, anode and electrolyte combinations can be employed in other electrochemical devices such as capacitors and hybrid capacitors/batteries.

Example 1

Figure 2:
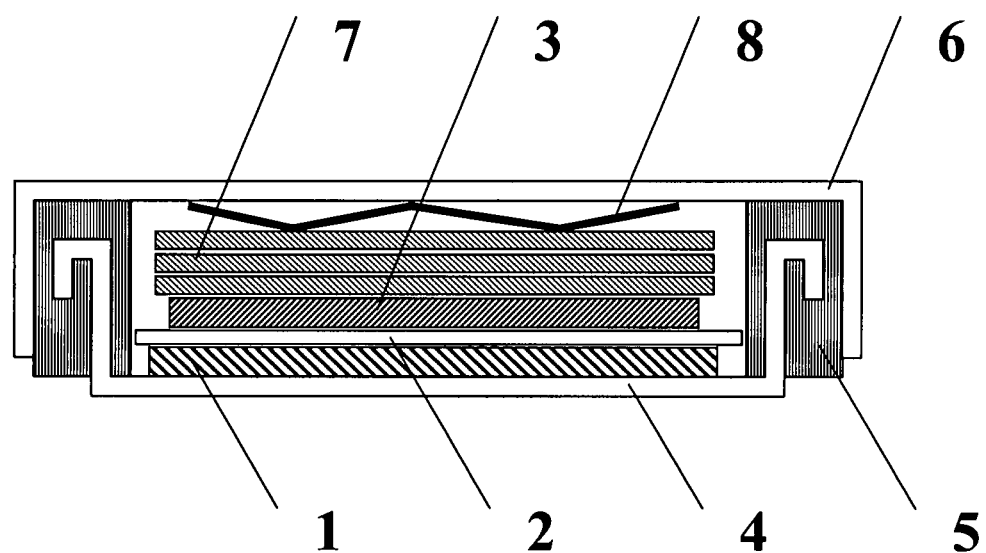
FIG. 2 illustrates a cross section of a button cell.

A variety of 2032 type button cells were generated having a structure according to FIG. 2. The button cells include a separator 2 positioned between a cathode 1 and an anode 3. The anode and cathode are positioned in a chamber defined by a case 4, a gasket 5 and a cover 6. Three spacers 7 and a spring washer 8 are positioned between the anode 3 and the case 4. The spacer 7 and spring washer 8 were made of stainless steel. An electrolyte positioned between the case 4 and the cover 6 activates the anode and the cathode.

First cathodes were generated by mixing $LiNi_{0.80}Co_{0.15}Al_{0.05}O_2$ (Toda Co.), a solution of PVDF in n-methylpyrolidone (NMP), and acetylene black in a mixer. The mixture was coated on an aluminum substrate, dried, and pressed. The resulting cathode medium was about 92 wt %

LiNi$_{0.80}$Co$_{0.15}$Al$_{0.05}$O$_2$, 3 wt % acetylene black, 5 wt % PVDF. Cathodes 15 mm in diameter were cut out of the result.

First anodes included a 30 μm thick lithium metal sheet on a 10 μm thick copper substrate (Honjo Co).

A first electrolyte was prepared by mixing a first solution and a second solution at a volume ratio of 1:1. The first solution was generated by dissolving LiBOB to 0.8 M in a disiloxane according to formula VII with R$_1$=—CH$_3$, R$_2$=—CH$_3$, R$_3$=—CH$_3$, R$_4$=—CH$_3$, R$_5$=—CH$_3$, and R$_6$=—(CH$_2$)$_3$—O(CH$_2$CH$_2$O)$_3$CH$_3$. The second solution was generated by dissolving LiPF$_6$ to 1.2 M in a mixture of EC/DMC having a volume ratio of 1:1.

A second electrolyte was prepared by mixing a first solution and a second solution at a volume ratio of 1:4. The first solution was generated by dissolving LiBOB to 0.8 M in a disiloxane according to formula VII with R$_1$=—CH$_3$, R$_2$=—CH$_3$, R$_3$=—CH$_3$, R$_4$=—CH$_3$, R$_5$=—CH$_3$, and R$_6$=—(CH$_2$)$_3$—O(CH$_2$CH$_2$O)$_3$CH$_3$. The second solution was generated by dissolving LiPF$_6$ to 1.2 M in a mixture of EC/DMC having a volume ratio of 1:1.

A third electrolyte was prepared by mixing a first solution and a second solution at a volume ratio of 1:1. The first solution was generated by dissolving LiBOB to 0.8 M in a disiloxane according to formula VII-J with m=n=3. The second solution was generated by dissolving LiPF$_6$ to 1.2 M in a mixture of EC/DMC having a volume ratio of 1:1.

A fourth electrolyte was prepared by mixing a first solution and a second solution at a volume ratio of 1:1. The first solution was generated by dissolving LiBOB to 0.8 M in a silane according to formula VIII-D with n=3. The second solution was generated by dissolving LiPF$_6$ to 1.2 M in a mixture of EC/DMC having a volume ratio of 1:1.

A fifth electrolyte was prepared by mixing a first solution and a second solution at a volume ratio of 1:1. The first solution was generated by dissolving LiBOB to 0.8 M in a silane according to formula VIII-E with n=3. The second solution was generated by dissolving LiPF$_6$ to 1.2 M in a mixture of EC/DMC having a volume ratio of 1:1.

A sixth electrolyte was prepared by mixing a first solution and a second solution at a volume ratio of 1:1. The first solution was generated by dissolving LiBOB to 0.8 M in a polysiloxane according to formula II with R=R$_1$=R$_3$=—CH$_3$, R$_4$=R$_5$=R$_6$=—(CH$_2$)$_3$(OCH$_2$CH$_2$)$_3$OCH$_3$ and n+m+k=30. The second solution was generated by dissolving LiPF$_6$ to 1.2 M in a mixture of EC/DMC having a volume ratio of 1:1.

A seventh electrolyte was prepared by was generated by dissolving LiPF$_6$ to 1.2 M in a mixture of EC/DMC having a volume ratio of 1:1.

First cells were generated according to FIG. 2 with a first cathode, a first anode, and the seventh electrolyte. Second cells were generated according to FIG. 2 with a first cathode, a first anode, and the first electrolyte. Third cells were generated according to FIG. 2 with a first cathode, a first anode, and the second electrolyte.

The cells were repeatedly charged and discharged between 3.0 V and 4.0 V. During formation of a passivation layer in the first cycle, the cells were charged using constant current at a rate of C/20 followed by charging at constant voltage until the current falls to C/100. During the same cycle, the cells were discharged at C/20. During the subsequent cycles, the cells were charged using constant current at a rate of C/5 followed by charging at constant voltage until the current falls to C/20 and were discharged at C/5. The tests were carried out at 23° C.

Figure 3:
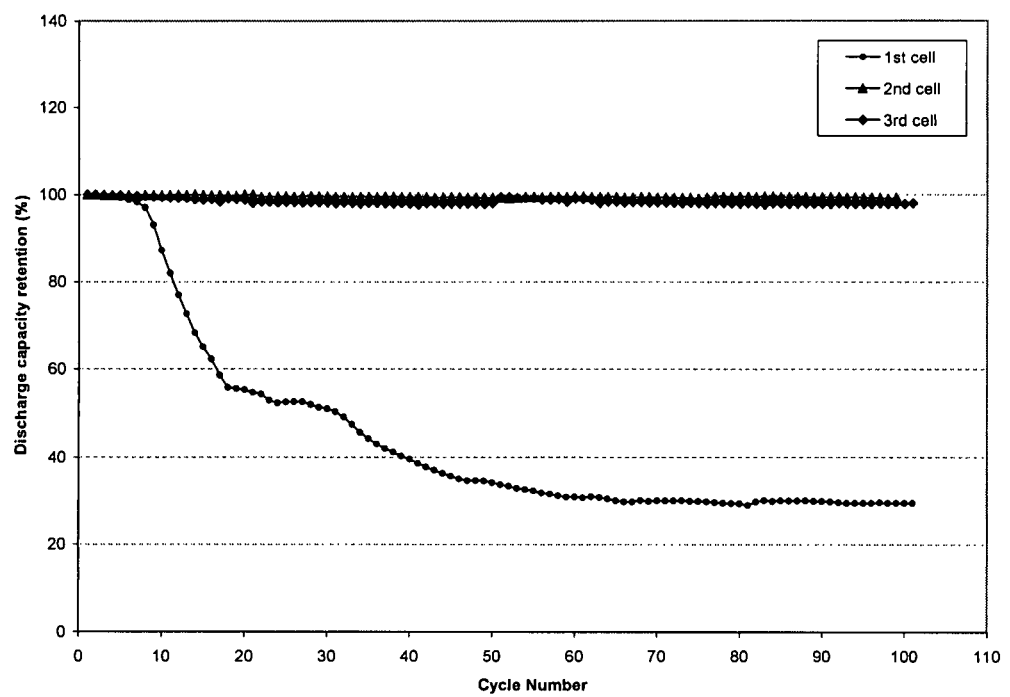
FIG. 3 compares the cycling performance of batteries having an electrolyte that includes a mixture of siloxane and organic solvent against the performance of a battery having only organic solvents.

FIG. 3 presents the cycling data for a first cell, a second cell and a third cell as a plot of discharge capacity retention versus cycle number. The electrolyte in the first cell does not include an electrolyte with a mixture of siloxane and organic solvent and shows a drop in discharge capacity retention at low cycle numbers. In contrast, the second cell and the third cell have electrolytes with a combination of siloxane and organic solvent and show a sustained discharge capacity retention.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A battery, comprising:
    an electrolyte activating one or more anodes and one or more cathodes,
        the electrolyte including one or more salts in a solvent that includes one or more or more organic solvents and one or more components selected from a group consisting of siloxanes and silanes,
        a volume ratio of the one or more organic solvents: the one or more components being greater than 1:4 in the electrolyte, and
    at least one of the anodes including one or more anode components selected from a group consisting of lithium metal, a lithium metal alloy or a lithium metal intermetallic compound.

2. The battery of claim 1, wherein the solvent includes a siloxane and a silane.

3. The battery of claim 1, wherein at least one of the anodes includes lithium metal.

4. The battery of claim 1, wherein at least one of the anodes consists of lithium metal.

5. The battery of claim 1, wherein at least one of the anodes includes a lithium metal alloy.

6. The battery of claim 1, wherein at least one of the anodes includes a lithium metal intermetallic compound.

7. The battery of claim 1, wherein the electrolyte includes a mixture of salts.

8. The battery of claim 7, wherein the electrolyte includes an organoborate salt.

9. The battery of claim 8, wherein the one or more salts include a non-organoborate salt in addition to the organoborate salt.

10. The battery of claim 9, wherein the organoborate salt includes a mono[bidentate]borate salt.

11. The battery of claim 9, wherein the organoborate salt includes a dihalo mono[bidentate]borate.

12. The battery of claim 9, wherein the organoborate salt includes a lithium dihalo mono[bidentate]borate.

13. The battery of claim 9, wherein the organoborate salt includes lithium difluoro oxalatoborate (LiDfOB).

14. The battery of claim 9, wherein the organoborate salt is represented by

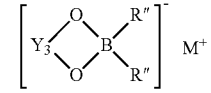

wherein M$^+$ is a metal ion selected from the Group I or Group II elements; Y$_3$ is selected from the group consisting of —CX(CR$_2$)$_a$CX—, —CZZ'(CR$_2$)$_a$CZZ'—,
    —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR % CR'$_3$ or R'; R" is a halogen; R' is halogen or hydrogen; R is hydrogen, alkyl, halogenated alkyl, cyano, or halogen; a is 0 to 4; and b is 1 to 4.

15. The battery of claim 9, wherein the organoborate salt includes a bis[bidentate]borate.

16. The battery of claim 9, wherein the organoborate salt is represented by

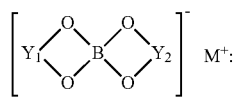

wherein $M^+$ is a metal ion selected from the Group I or Group II elements; $Y_1$ and $Y_2$ are each selected from the group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$ SO$_2$—, and —CO(CR$_2$)$_b$SO$_2$—; X is O or NR', Z is alkyl, halogenated alkyl, —C=NR', CR'$_3$ or R; Z' is alkyl, halogenated alkyl, CR'$_3$ or R'; R' is halogen or hydrogen; R is hydrogen, alkyl, halogenated alkyl, cyano, or halogen; a is 0 to 4 and b is 1 to 4.

17. The battery of claim 13, wherein the non-organoborate salt is selected from a group consisting of LiClO$_4$, LiBF$_4$, LiAsF$_6$, LiPF$_6$, LiSbF$_6$, LiCF$_3$SO$_3$, LiC$_6$F$_5$SO$_3$, LiC(CF$_3$SO$_2$)$_3$, LiN(SO$_2$C$_2$F$_5$)$_2$, LiN(SO$_2$CF$_3$)$_2$, LiAlCl$_4$, LiGaCl$_4$, LiSCN, LiO$_2$, LiO$_3$SCF$_3$, LiO$_2$CCF$_3$, LiSO$_6$F, LiB(C$_6$H$_5$)$_4$, Li-methide, Li-imide and lithium alkyl fluorophosphates.

18. The battery of claim 1, wherein the electrolyte includes one or more silanes.

19. The battery of claim 18, wherein at least one silane includes a silicon linked to one or more substituents that each include a poly(alkylene oxide) moiety or a cyclic carbonate moiety.

20. The battery of claim 18, wherein at least one silane is represented by $Si_{4-x-y}R'_xR''_y$; wherein R is an alkyl group, an aryl group or a halogen, $R'_x$ is represented by Formula VIII-A or Formula VIII-C, $R''_y$ is represented by Formula VIII-B, x is 0 to 4, y is 0 to 4, 4-x-y indicates the number of R substituents, and x+y is at least 1; Formula VIII-A:

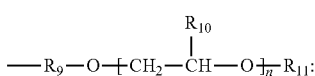

wherein $R_9$ is nil or an organic spacer, $R_{10}$ is hydrogen; alkyl or aryl; $R_{11}$ is alkyl or aryl; and n is 1 to 15;
Formula VIII-B

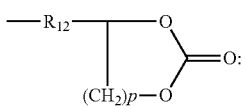

wherein $R_{12}$ is an organic spacer and p is 1 to 2; and
Formula VIII-C

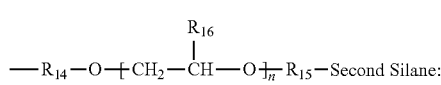

where $R_{14}$ is nil or a spacer; $R_{15}$ is nil or a spacer; $R_{16}$ is hydrogen, alkyl or aryl; second silane represents another silane and n is 1 to 15.

21. The battery of claim 1, wherein the electrolyte includes one or more disiloxanes.

22. The battery of claim 21, wherein at least one disiloxane includes a backbone with a silicon linked to one or more substituents that each include a poly(alkylene oxide) moiety or a cyclic carbonate moiety.

23. The battery of claim 21, wherein at least one disiloxane is represented by:

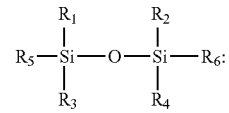

wherein $R_1$ is an alkyl group or an aryl group; $R_2$ is an alkyl group or an aryl group; $R_3$ is an alkyl group or an aryl group; $R_4$ is an alkyl group or an aryl group; $R_5$ is represented by Formula VII-A, Formula VII-B or Formula VII-C; $R_6$ is an alkyl group, an aryl group, represented by Formula VII-D, or represented by Formula VII-E;
Formula VII-A:

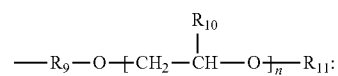

wherein $R_9$ is nil or a spacer; $R_{10}$ is hydrogen; alkyl or aryl; $R_{11}$ is alkyl or aryl; and n is 1 to 12;
Formula II-B:

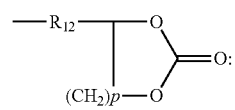

wherein $R_{12}$ is an organic spacer and p is 1 to 2;
Formula VII-C:

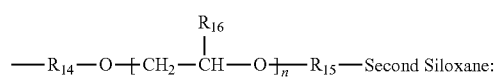

where $R_{14}$ is nil or a spacer, $R_{15}$ is nil or a spacer; $R_{16}$ is hydrogen, alkyl or aryl; second siloxane represents another siloxane and n is 1 to 12;
Formula VII-D:

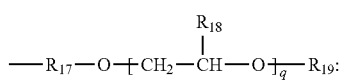

wherein $R_{17}$ is nil or a spacer; $R_{18}$ is hydrogen; alkyl or aryl; $R_{19}$ is alkyl or aryl; and q is 1 to 12; and
Formula VII-E:

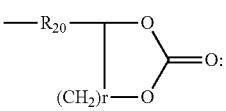

wherein $R_{20}$ is an organic spacer and p is 1 to 2.

24. The battery of claim 1, wherein the electrolyte includes one or more trisiloxanes.

25. The battery of claim 24, wherein at least one trisiloxane includes a backbone with three silicons, one or more of the silicons being linked to one or more substituents that each include a poly(alkylene oxide) moiety or a cyclic carbonate moiety.

26. The battery of claim 24, wherein at least one trisiloxane is represented by:

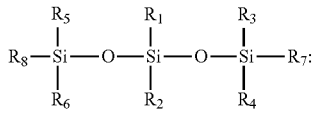

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D;

Formula V-A:

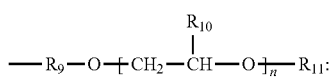

wherein $R_9$ is nil or a spacer, $R_{10}$ is hydrogen; alkyl or aryl; $R_{11}$ is alkyl or aryl; and n is 1 to 12;

Formula V-B:

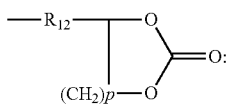

wherein $R_{12}$ is an organic spacer and p is 1 to 2;

Formula V-C:

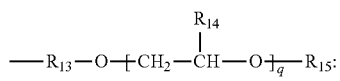

wherein $R_{13}$ is nil or a spacer; $R_{14}$ is hydrogen; alkyl or aryl; $R_{15}$ is alkyl or aryl; and q is 1 to 12; and Formula V-D:

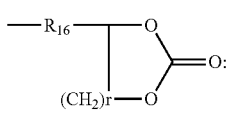

wherein $R_{16}$ is an organic spacer and p is 1 to 2.

27. The battery of claim 24, wherein at least one trisiloxane is represented by:

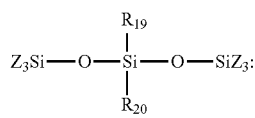

wherein $R_{19}$ is an alkyl group or an aryl group; $R_{20}$ is represented by Formula VI-A, Formula VI-B or Formula VI-C;

Formula VI-A:

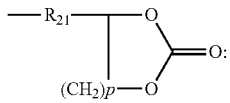

wherein $R_{21}$ is an organic spacer and p is 1 to 2;

Formula VI-B:

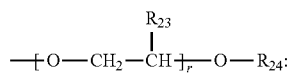

wherein $R_{23}$ is hydrogen; alkyl or aryl; $R_{24}$ is alkyl or aryl; and r is 1 to 12; and Formula VI-C:

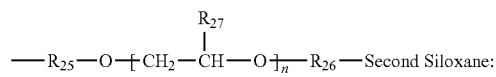

where $R_{25}$ is nil or a spacer; $R_{26}$ is nil or a spacer; $R_{27}$ is hydrogen, alkyl or aryl; second siloxane represents another siloxane and n is 1 to 12.

28. The battery of claim 1, wherein the electrolyte includes one or more tetrasiloxanes.

29. The battery of claim 28, wherein at least one tetrasiloxane includes a backbone with four silicons, one or more of the silicons being linked to one or more substituents that each include a poly(alkylene oxide) moiety or a cyclic carbonate moiety.

30. The battery of claim 1, wherein the electrolyte includes one or more polysiloxanes.

31. The battery of claim 30, wherein at least one polysiloxane includes a backbone with five or more silicons, one or more of the silicons being linked to one or more substituents that each include a poly(alkylene oxide) moiety or a cyclic carbonate moiety.

32. The battery of claim 20, wherein the solvent includes a siloxane in addition to the at least one silane represented by $SiR_{4-x-y}R'_xR''_y$.

33. The battery of claim 1, wherein at least one of the one or more organic solvents is selected from a group consisting of cyclic carbonates, linear carbonates, dialkyl carbonates, aliphatic carboxylate esters, linear ethers, cyclic ethers, and fluorinated carboxylate esters.

34. The battery of claim 1, wherein at least one of the one or more organic solvents is selected from a group consisting of propylene carbonate (PC), ethylene carbonate (EC), butylene carbonate (BC), vinylene carbonate (VC), dimethyl carbonate (DMC), diethyl carbonate (DEC), ethylmethyl carbonate (EMC) and dipropyl carbonate (DPC), diglyme, trigylme, tetragylme, 1,2-dimethoxyethane (DME).

35. The battery of claim 1, wherein the total volume of the one or more components selected from the group consisting of siloxanes and silanes is less than 50% of the solvent volume.

36. The battery of claim 1, wherein the volume ratio is also less that than 2:4.

37. The battery of claim 1, wherein the volume ratio is such that the presence of the one more or more organic solvents in the electrolyte reduces the viscosity of the one or more components in the electrolyte.

38. A method of forming a battery comprising:
generating an electrolyte having one or more salts in a solvent that includes an organic solvent and one or more components selected from a group consisting of siloxanes and silanes,
  a volume ratio of the one or more organic solvents: the one or more components being greater than 1:4 in the electrolyte, and
activating one or more anodes and one or more cathodes with the electrolyte, at least one of the anodes including one or more anode components selected from a group consisting of lithium metal, a lithium metal alloy and a lithium metal intermetallic compound.

* * * * *